United States Patent
Hsu et al.

(10) Patent No.: US 10,571,660 B2
(45) Date of Patent: Feb. 25, 2020

(54) IMAGING LENS ASSEMBLY, IMAGING APPARATUS AND ELECTRONIC DEVICE

(71) Applicant: LARGAN PRECISION CO., LTD., Taichung (TW)

(72) Inventors: Po-Lun Hsu, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 144 days.

(21) Appl. No.: 15/701,482

(22) Filed: Sep. 12, 2017

(65) Prior Publication Data

US 2018/0275373 A1 Sep. 27, 2018

(30) Foreign Application Priority Data

Mar. 22, 2017 (TW) .............................. 106109586 A

(51) Int. Cl.
| | | |
|---|---|---|
| G02B 3/02 | (2006.01) | |
| G02B 13/18 | (2006.01) | |
| G02B 13/00 | (2006.01) | |
| G02B 27/00 | (2006.01) | |

(Continued)

(52) U.S. Cl.
CPC ........... *G02B 13/0045* (2013.01); *G02B 9/60* (2013.01); *G02B 13/18* (2013.01); *G02B 27/0025* (2013.01); *G02B 27/646* (2013.01)

(58) Field of Classification Search
CPC .... G02B 13/0045; G02B 13/18; G02B 13/04; G02B 13/0015; G02B 13/48; G02B 9/60; G02B 3/04; G02B 27/646; G02B 27/0025; H04N 5/2254; H04N 5/225
See application file for complete search history.

(56) References Cited

U.S. PATENT DOCUMENTS

| | | |
|---|---|---|
| 9,097,877 B2 | 8/2015 | Tsai et al. |
| 10,241,303 B2 * | 3/2019 | Chen .................. G02B 13/0045 |
| 2015/0014515 A1 | 1/2015 | Lin et al. |

(Continued)

FOREIGN PATENT DOCUMENTS

| | | |
|---|---|---|
| CN | 104345432 A | 2/2015 |
| CN | 105425368 A | 3/2016 |

(Continued)

*Primary Examiner* — William R Alexander
*Assistant Examiner* — Tamara Y. Washington
(74) *Attorney, Agent, or Firm* — McClure, Qualey & Rodack, LLP

(57) ABSTRACT

An imaging lens assembly includes five lens elements, which are, in order from an object side to an image side, a first lens element, a second lens element, a third lens element, a fourth lens element and a fifth lens element. The first lens element has positive refractive power. The second lens element has positive refractive power. The fourth lens element with negative refractive power has an object-side surface being convex in a paraxial region thereof and an image-side surface being concave in a paraxial region thereof, wherein the two surfaces of the fourth lens element are both aspheric. The fifth lens element having an image-side surface being concave in a paraxial region thereof, wherein two surfaces of the fifth lens element are both aspheric, and the image-side surface of the fifth lens element includes at least one convex critical point in an off-axis region thereof.

25 Claims, 21 Drawing Sheets

(51) Int. Cl.
  *G02B 27/64* (2006.01)
  *G02B 9/60* (2006.01)

(56) References Cited

U.S. PATENT DOCUMENTS

| | | |
|---|---|---|
| 2015/0015767 A1 | 1/2015 | Lin et al. |
| 2015/0015772 A1 | 1/2015 | Lin et al. |
| 2015/0029383 A1 | 1/2015 | Tsai et al. |
| 2016/0187624 A1 | 6/2016 | Lin et al. |
| 2016/0334607 A1 | 11/2016 | Chen |
| 2016/0349489 A1 | 12/2016 | Dai et al. |
| 2017/0038557 A1 | 2/2017 | Chen et al. |
| 2017/0045714 A1* | 2/2017 | Huang ............... G02B 9/64 |
| 2017/0059825 A1* | 3/2017 | Tang ............ G02B 13/0045 |
| 2017/0059826 A1* | 3/2017 | Tang ................ G02B 9/64 |
| 2017/0299846 A1* | 10/2017 | Lin .................. G02B 9/62 |
| 2017/0336602 A1* | 11/2017 | Chen ................ G02B 1/04 |
| 2017/0363841 A1* | 12/2017 | Chen ................ G02B 9/62 |
| 2018/0011300 A1* | 1/2018 | Chen ................ G02B 9/60 |
| 2018/0143405 A1* | 5/2018 | Hsueh ............ G02B 27/0025 |
| 2018/0188493 A1* | 7/2018 | Huang ............ G02B 13/0045 |
| 2018/0239115 A1* | 8/2018 | Hsu ................... G02B 9/64 |
| 2018/0275373 A1* | 9/2018 | Hsu ............... G02B 13/0045 |
| 2018/0284393 A1* | 10/2018 | Huang ............ G02B 13/0045 |
| 2018/0335608 A1* | 11/2018 | Chang ............. G02B 13/0045 |
| 2018/0335609 A1* | 11/2018 | Chang ............. G02B 13/0045 |
| 2018/0335611 A1* | 11/2018 | Chen .............. G02B 13/0045 |
| 2018/0348484 A1* | 12/2018 | Chen .............. G02B 13/0045 |
| 2018/0356613 A1* | 12/2018 | Chen ................ G02B 13/06 |
| 2018/0364454 A1* | 12/2018 | Yang ............. G02B 13/0045 |
| 2019/0004285 A1* | 1/2019 | Tang ............. G02B 13/0045 |
| 2019/0011671 A1* | 1/2019 | Huang ........... G02B 13/0045 |
| 2019/0041610 A1* | 2/2019 | Wu |
| 2019/0056568 A1* | 2/2019 | Huang ........... G02B 13/0045 |
| 2019/0079270 A1* | 3/2019 | Tseng ........... G02B 13/0045 |
| 2019/0094497 A1* | 3/2019 | Huang ........... G02B 13/0045 |

FOREIGN PATENT DOCUMENTS

| | | |
|---|---|---|
| CN | 106405796 A | 2/2017 |
| TW | 201640169 A | 11/2016 |
| WO | 2018090609 A1 | 5/2018 |

* cited by examiner

IMAGING LENS ASSEMBLY, IMAGING APPARATUS AND ELECTRONIC DEVICE

RELATED APPLICATIONS

This application claims priority to Taiwan Application Serial Number 106109586, filed Mar. 22, 2017, which is herein incorporated by reference.

BACKGROUND

Technical Field

The present disclosure relates to an imaging lens assembly and an imaging apparatus. More particularly, the present disclosure relates to an imaging lens assembly and an imaging apparatus with compactness and wide field of view applicable to electronic devices.

Description of Related Art

With the wider application of photographing modules, installing photographing modules in various smart electronic devices, portables, mobile devices, recognition devices, entertainment systems, sporting devices and smart home assisting systems is becoming a major trend in developments for future technology, especially portables with high image quality being in high demand. In order to obtain more extensive experiences in utilizations, smart devices with one, two or more than three lens assemblies are becoming the market mainstream, and various photographing modules with different features are developed in response to different demands.

Furthermore, with the recent demands of compact electronic devices, conventional photographing modules are difficult to meet both requirements of high quality and compactness, especially compact lens assemblies with the characteristics of large aperture or wider field of view, etc. By having compact lens configurations in conventional lens assemblies, it is difficult for light from a larger view angle entering the photographing modules and thus is unable to provide the feature of a large field of view. In contrast, if lens configuration of the wide field of view is achieved, the total track length of photographing modules will be longer and cannot satisfy the demand for compactness. Hence, a photographing module which has both characteristics of wide field of view and compactness to fully satisfy market specifications and demands is needed.

SUMMARY

According to one aspect of the present disclosure, an imaging lens assembly includes five lens elements, the five lens elements being, in order from an object side to an image side, a first lens element, a second lens element, a third lens element, a fourth lens element and a fifth lens element. The first lens element has positive refractive power. The second lens element has positive refractive power. The fourth lens element with negative refractive power has an object-side surface being convex in a paraxial region thereof and an image-side surface being concave in a paraxial region thereof, wherein the object-side surface and the image-side surface of the fourth lens element are both aspheric. The fifth lens element has an image-side surface being concave in a paraxial region thereof, wherein an object-side surface and the image-side surface of the fifth lens element are both aspheric, and the image-side surface of the fifth lens element includes at least one convex critical point in an off-axis region thereof. When a focal length of the imaging lens assembly is f, a focal length of the first lens element is f1, a focal length of the third lens element is f3, a focal length of the fourth lens element is f4, and a focal length of the fifth lens element is f5, the following conditions are satisfied:

$0.75 < |f/f4| + |f/f5|$; and $|f1/f3| < 1.0$.

According to another aspect of the present disclosure, an imaging apparatus includes the imaging apparatus of the aforementioned aspect and an image sensor, wherein the image sensor is disposed on an image surface of the imaging lens assembly.

According to another aspect of the present disclosure, an electronic device includes the imaging apparatus of the aforementioned aspect.

According to one aspect of the present disclosure, an imaging lens assembly includes five lens elements, the five lens elements being, in order from an object side to an image side, a first lens element, a second lens element, a third lens element, a fourth lens element and a fifth lens element. The first lens element has positive refractive power. The second lens element with positive refractive power has an image-side surface being convex in a paraxial region thereof. The fourth lens element with negative refractive power has an image-side surface being concave in a paraxial region thereof, wherein an object-side surface and the image-side surface of the fourth lens element are both aspheric. The fifth lens element has an image-side surface being concave in a paraxial region thereof, wherein an object-side surface and the image-side surface of the fifth lens element are both aspheric, and the image-side surface of the fifth lens element includes at least one convex critical point in an off-axis region thereof. When an Abbe number of the third lens element is V3, and an Abbe number of the fourth lens element is V4, the following condition is satisfied:

$10 < V3 + V4 < 60$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
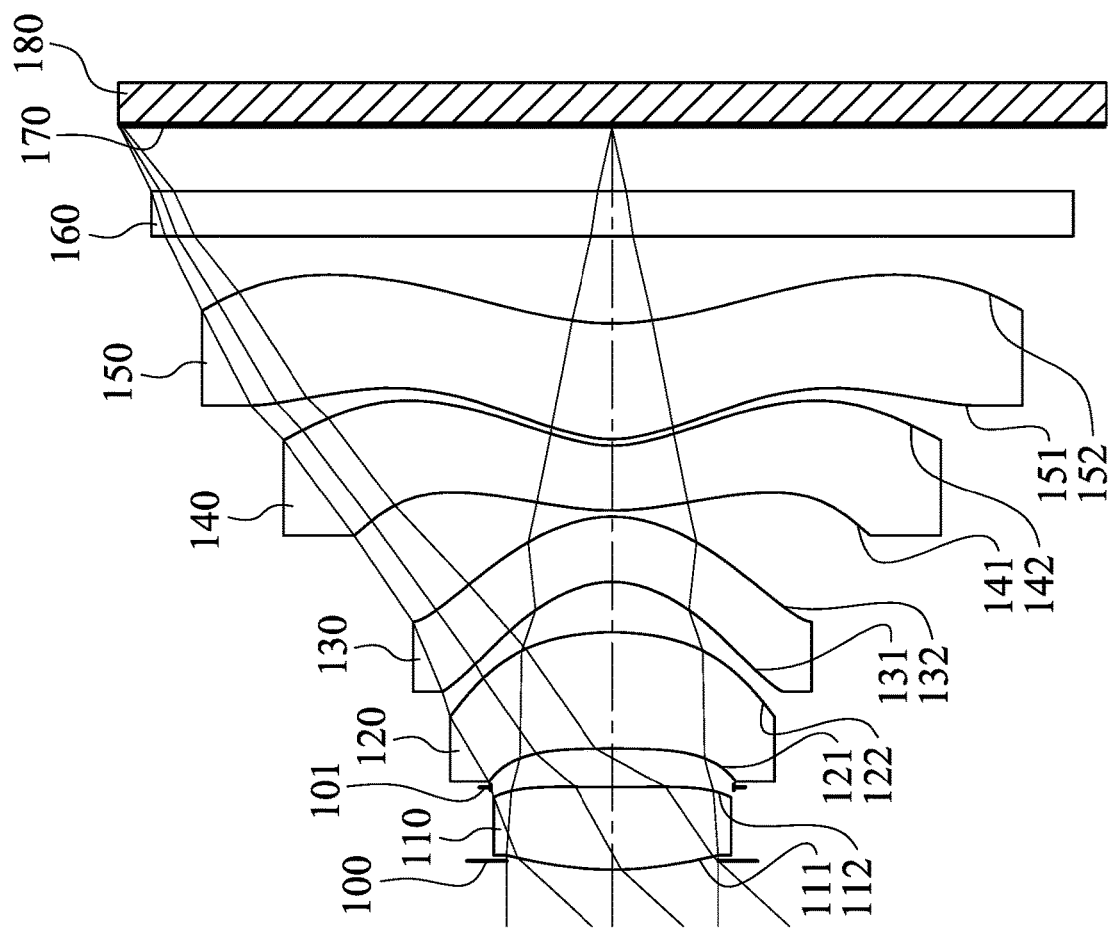
FIG. 1 is a schematic view of an imaging apparatus according to the 1st embodiment of the present disclosure.

An imaging lens assembly includes five lens elements, the five lens elements being, in order from an object side to an image side, a first lens element, a second lens element, a third lens element, a fourth lens element and a fifth lens element.

The first lens element has positive refractive power, so that it is favorable for the light from a large view angle converging in the imaging lens assembly. The first lens element can have an image-side surface including at least one convex critical point in an off-axis region thereof. Therefore, it is favorable for the light from a large view angle converging in the imaging lens assembly so as to avoid the surface reflection generated from a surface shape being excessively curved in the off-axis region of the lens element or to avoid the light which cannot be focused on the imaging surface during light refraction.

The second lens element has positive refractive power, so that the light can be guided to an image surface. The second lens element can have an image-side surface being convex in a paraxial region thereof, so that aberrations generated from the first lens element can be corrected so as to enhance the image quality.

The third lens element can have an image-side surface being convex in a paraxial region thereof, so that the ability of the aberration correction of the third lens element can be maintained.

The fourth lens element with negative refractive power has an object-side surface being convex in a paraxial region thereof and an image-side surface being concave in a paraxial region thereof, so that aberrations of the imaging lens assembly can be corrected. The object-side surface of the fourth lens element can include at least one concave critical point in an off-axis region thereof, and the image-side surface of the fourth lens element can include at least one convex critical point in an off-axis region thereof. Thus, it is favorable for correcting off-axis aberrations of the imaging lens assembly.

The fifth lens element can have positive refractive power and can have an object-side surface being convex in a paraxial region thereof. The fifth lens element has an image-side surface being concave in a paraxial region thereof. Therefore, the principal point of the imaging lens assembly can be positioned away from the image surface so as to reduce the back focal length for compactness. The image-side surface of the fifth lens element includes at least one convex critical point in an off-axis region thereof, so that it is favorable for correcting off-axis aberrations effectively.

When a focal length of the imaging lens assembly is f, a focal length of the fourth lens element is f4, and a focal length of the fifth lens element is f5, the following condition is satisfied: $0.75 < |f/f4| + |f/f5|$. Therefore, the refractive power of the fourth lens element and the fifth lens element can be enhanced for correcting aberrations of the imaging lens assembly in coordination with the first lens element and the second lens element with positive refractive power, so as to enhance the image quality and reduce the back focal length for system miniaturization. Preferably, the following condition can be satisfied: $1.25 < |f/f4| + |f/f5| < 3.5$.

When a focal length of the first lens element is f1, and a focal length of the third lens element is f3, the following condition is satisfied: $|f1/f3| < 1.0$. Therefore, it is favorable for avoiding weak refractive power of the first lens element and strong refractive power of the third lens element with overly large variation of the refractive power between the lens elements causing aberration overcorrection or insufficient correction thereof. Thus, the image quality can be enhanced effectively.

When an Abbe number of the third lens element is V3, and an Abbe number of the fourth lens element is V4, the following condition is satisfied: $10 < V3+V4 < 60$. Therefore, it is favorable for enhancing the ability of the chromatic aberration correction of the imaging lens assembly. Preferably, the following condition can be satisfied: $25 < V3+V4 < 50$.

When a curvature radius of the object-side surface of the second lens element is R3, and a curvature radius of the image-side surface of the second lens element is R4, the following condition is satisfied: $0.75 < (R3+R4)/(R3-R4) < 4.0$. Therefore, the shape arrangement of the second lens element is proper with the first lens element, so that aberrations generated from the first lens element can be corrected for enhancing the image quality in the off-axis region of the image.

When the focal length of the first lens element is f1, a focal length of the second lens element is f2, the focal length of the third lens element is f3, the focal length of the fourth lens element is f4, and the focal length of the fifth lens element is f5, the following conditions are satisfied: $|f4| < |f1| < |f3|$; $|f5| < |f1| < |f3|$; $|f4| < |f2| < |f3|$; and $|f5| < |f2| < |f3|$. Therefore, it is favorable for correcting aberrations and reducing the total track length so as to obtain the compactness.

When the focal length of the imaging lens assembly is f, a curvature radius of the object-side surface of the fourth lens element is R7, and a curvature radius of the image-side surface of the fourth lens element is R8, the following condition is satisfied: $(|R7|+|R8|)/f < 1.50$. Therefore, the curvatures of the two surfaces of the fourth lens element can provide sufficient refractive power so as to enhance aberration correction and the application flexibility.

When the focal length of the imaging lens assembly is f, and the focal length of the third lens element is f3, the following condition is satisfied: $-1.0 < f/f3 < 0.50$. Therefore, it is favorable for avoiding weak refractive power of the first lens element and strong refractive power of the third lens element with overly large variation of the refractive power between the lens elements causing improper aberrations correction. Thus, the image quality can be enhanced effectively.

The imaging lens assembly can further include an aperture stop, wherein a displacement in parallel with an optical axis from an axial vertex of an object-side surface of the first lens element and the aperture stop is Dr1s, and a displacement in parallel with the optical axis from the aperture stop and an axial vertex of the image-side surface of the first lens element is Dsr2, the following condition is satisfied: $|Dr1s/Dsr2| < 0.33$. Therefore, the arrangement of the aperture stop is proper for the light from a large view angle converging in the imaging lens assembly.

When the focal length of the imaging lens assembly is f, the focal length of the fourth lens element is f4, and the focal length of the fifth lens element is f5, the following condition is satisfied: $(f/f4) - (f/f5) < -2.0$. Therefore, the refractive power of the fourth lens element and the fifth lens element can be enhanced for correcting aberrations of the imaging lens assembly in coordination with the first lens element and the second lens element with positive refractive power. Thus, the image quality can be enhanced and the total track length of the back focal length can be reduced so as to obtain compactness.

When a maximum field of view of the imaging lens assembly is FOV, the following condition is satisfied: 85 degrees < FOV < 120 degrees. Therefore, it is favorable for obtaining the configuration for compactness and a large field of view in a wider range of applications and devices.

When an axial distance between the object-side surface of the first lens element and the image surface is TL, and a maximum image height of the imaging lens assembly is ImgH, the following condition is satisfied: $TL/ImgH < 1.60$. Therefore, it is favorable for obtaining compactness and a large field of view for a wide range of applications.

When the focal length of the imaging lens assembly is f, and a maximum optical effective radius of the image-side surface of the fifth lens element is Y52, the following condition is satisfied: $0.90 < f/Y52 < 1.30$. Therefore, it is favorable for enhancing the characteristic of large field of view and reducing the size of the fifth lens element to obtain compactness.

When the axial distance between the object-side surface of the first lens element and the image surface is TL, a maximum image height of the imaging lens assembly is ImgH, and a half of a maximum field of view of the imaging lens assembly is HFOV, the following condition is satisfied: $1.80 < TL/ImgH + 1/\tan(HFOV) < 2.60$. Therefore, it is favorable for obtaining compactness and a large field of view for a wider range of applications and devices.

When the focal length of the first lens element is f1, and the focal length of the second lens element is f2, the following condition is satisfied: $0.70 < |f1/f2| < 1.70$. Therefore, it is favorable for the light from large field of view converging onto the image surface by the arrangement of the first lens element and the second lens element.

When a curvature radius of an object-side surface of the third lens element is R5, a curvature radius of the image-side surface of the third lens element is R6, and the focal length of the imaging lens assembly is f, the following condition is satisfied: $(|R5| + |R6|)/f < 1.0$. Therefore, the configuration of the two surfaces of the third lens element provides sufficient refractive power to enhance the ability of aberration correction of the third lens element.

When the focal length of the fourth lens element is f4, and the focal length of the fifth lens element is f5, the following condition is satisfied: $-2.0 < f4/f5 < -0.75$. Therefore, it is favorable for avoiding the excessive difference between the refractive power of the fourth lens element and the fifth lens element causing insufficient aberration correction or aberration overcorrection.

When an Abbe number of the first lens element is V1, an Abbe number of the second lens element is V2, the Abbe number of the third lens element is V3, and the Abbe number of the fourth lens element is V4, the following condition is satisfied: $1.75 < (V1+V2)/(V3+V4) < 3.50$. Therefore, it is favorable for enhancing the image quality by improving chromatic aberration correction of the imaging lens assembly.

Each of the aforementioned features of the imaging lens assembly can be utilized in numerous combinations, so as to achieve the corresponding effects.

According to the imaging lens assembly of the present disclosure, the lens elements thereof can be made of glass or plastic materials. When the lens elements are made of plastic materials, manufacturing costs can be effectively reduced. When the lens elements are made of glass materials, the distribution of the refractive power of the imaging lens assembly may be more flexible to design. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the imaging lens assembly. Therefore, the total track length of the imaging lens assembly can also be reduced.

According to the imaging lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the imaging lens assembly of the present disclosure, the refractive power or the focal length of a lens element being positive or negative may refer to the refractive power or the focal length in a paraxial region of the lens element.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, the image surface of the imaging lens assembly, based on the corresponding image sensor, can be flat or curved. In particular, the image surface can be a concave curved surface facing towards the object side. According to the imaging lens assembly of the present disclosure, at least one image correcting element (such as a field flattener) can be selectively disposed between the lens element closest to the image side of the imaging lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin planar-concave element having a concave surface toward the object side and is disposed close to the image surface.

According to the imaging lens assembly of the present disclosure, an aperture stop can be configured as a front stop or a middle stop. A front stop disposed between an object and the first lens element can provide a longer distance between an exit pupil of the imaging lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the imaging lens assembly and thereby provides a wider field of view for the same.

According to the imaging lens assembly of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point.

According to the imaging lens assembly of the present disclosure, the image capturing lens system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned imaging lens assembly and an image sensor, wherein the image sensor is disposed on the image side of the aforementioned imaging lens assembly, that is, the image sensor can be disposed on or near the image surface of the aforementioned imaging lens assembly. It is favorable for the light from large field of view converging in the imaging lens assembly by the positive refractive power of the first lens element, and guiding the incident light to the image surface by the positive refractive power of the second lens element, so as to satisfy the demand of wide field of view and compactness. Furthermore, it is favorable for correcting aberrations by the fourth lens element with negative refractive power, so that the image quality can be enhanced. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
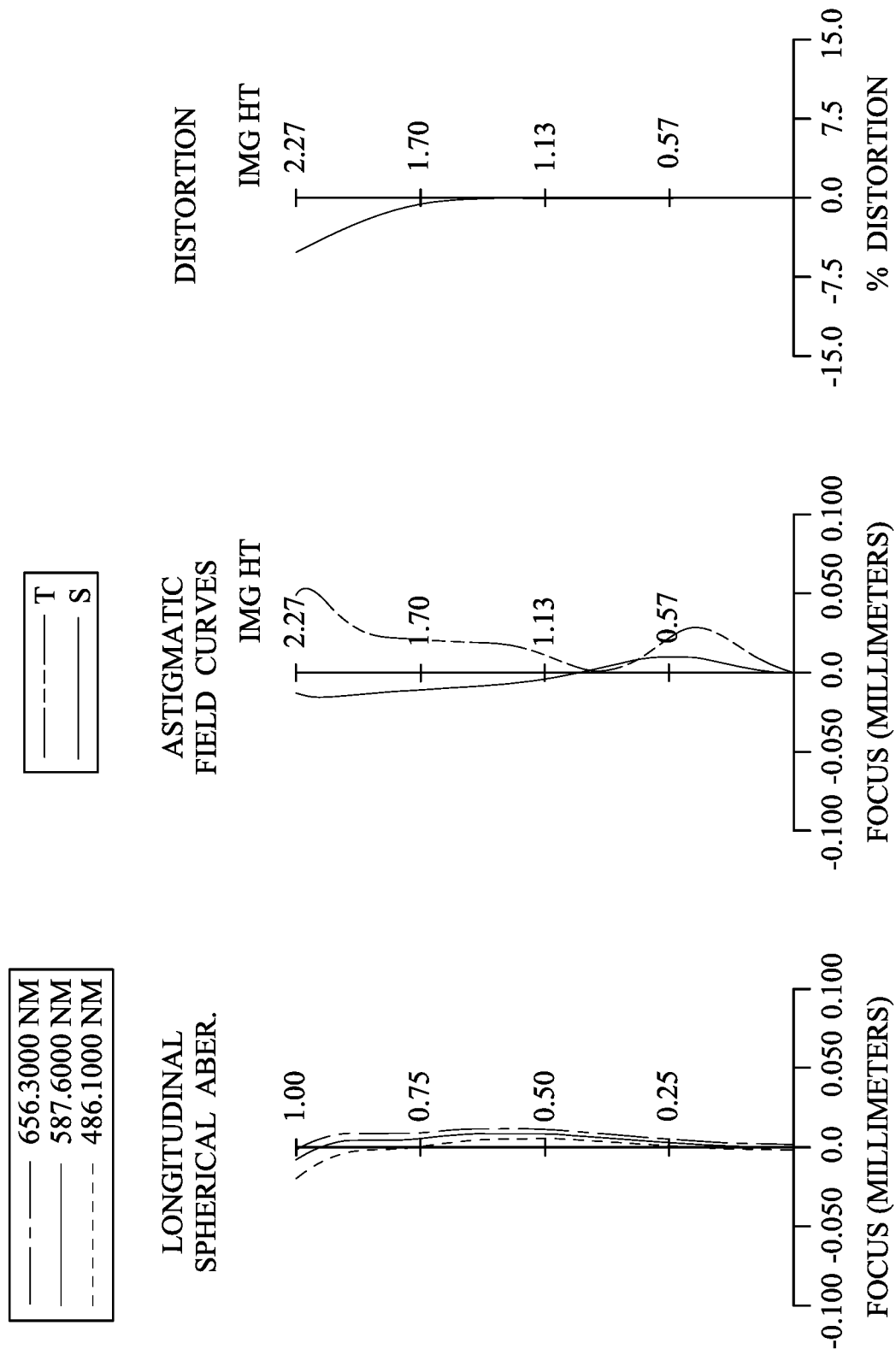
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an imaging lens assembly (its reference numeral is omitted) and an image sensor 180. The imaging lens assembly includes, in order from an object side to an image side, an aperture stop 100, a first lens element 110, a stop 101, a second lens element 120, a third lens element 130, a fourth lens element 140, a fifth lens element 150, an IR-cut filter 160 and an image surface 170, wherein the image sensor 180 is disposed on the image surface 170 of the imaging lens assembly. The imaging lens assembly includes five lens elements (110, 120, 130, 140 and 150) without additional one or more lens elements inserted between the first lens element 110 and the fifth lens element 150.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. Furthermore, the image-side surface 112 of the first lens element 110 includes at least one convex critical point in an off-axis region thereof.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being concave in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, the object-side surface 141 of the fourth lens element 140 includes at least one concave critical point in an off-axis region thereof, and the image-side surface 142 of the fourth lens element 140 includes at least one convex critical point in an off-axis region thereof.

The fifth lens element 150 with positive refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least one convex critical point in an off-axis region thereof.

The IR-cut filter 160 is made of a glass material and located between the fifth lens element 150 and the image surface 170, and will not affect the focal length of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of a maximum field of view of the imaging lens assembly is HFOV, these parameters have the following values: f=2.19 mm; Fno=2.25; and HFOV=47.5 degrees.

In the imaging lens assembly according to the 1st embodiment, when a maximum field of view of the imaging lens assembly is FOV, the following condition is satisfied: FOV=95.00 degrees.

In the imaging lens assembly according to the 1st embodiment, when an Abbe number of the first lens element 110 is V1, an Abbe number of the second lens element 120 is V2, an Abbe number of the third lens element 130 is V3, and an Abbe number of the fourth lens element 140 is V4, the following condition are satisfied: (V1+V2)/(V3+V4)=2.81; and V3+V4=39.9.

In the imaging lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=1.73.

In the imaging lens assembly according to the 1st embodiment, when the focal length of the imaging lens assembly is f, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following conditions are satisfied: (|R5|+|R6|)/f=0.48; and (|R7|+|R8|)/f=0.91.

Figure 15:
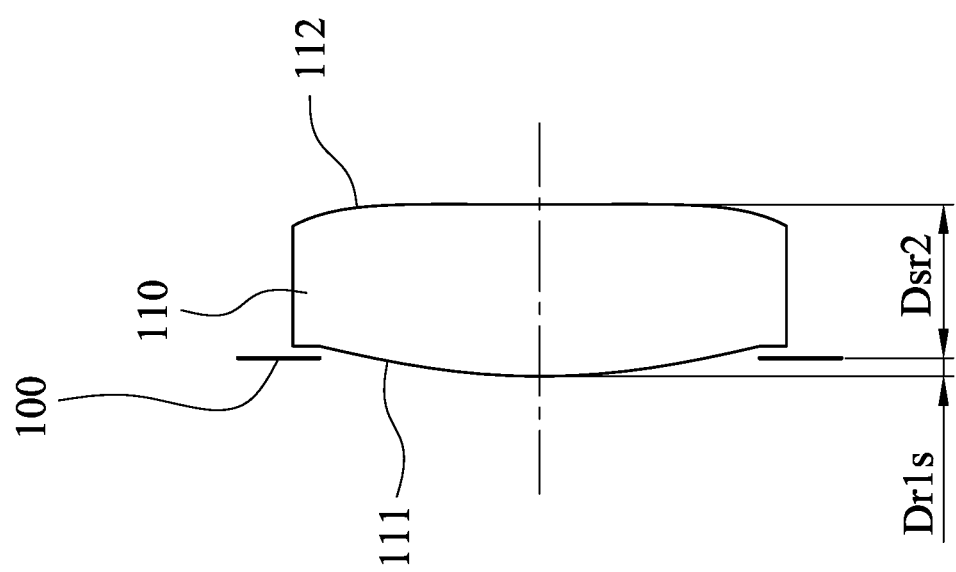
FIG. 15 is a schematic view of parameters Dr1s and Dsr2 according to the 1st embodiment of FIG. 1.

FIG. 15 is a schematic view of parameters Dr1s and Dsr2 according to the 1st embodiment of FIG. 1. In FIG. 15, when a displacement in parallel with the optical axis from an axial vertex of the object-side surface 111 of the first lens element 110 and the aperture stop 100 is Dr1s (when the point of the object-side surface 111 of the first lens element 110 on the optical axis or the axial vertex, is closer to the object side than a central point of the aperture stop 100 to the object side, the value of Dr1s is positive; when the point of the object-side surface 111 of the first lens element 110 on the optical axis is closer to the image side than the central point of the aperture stop 100 to the image side, the value of Dr1s is negative), and a displacement in parallel with the optical axis from the aperture stop 100 and an axial vertex of the image-side surface 112 of the first lens element 110 is Dsr2 (when the central point of the aperture stop 100 is closer to object side than the point of the image-side surface 112 of the first lens element 110 on the optical axis to the object side, the value of Dsr2 is positive; when the central point of the aperture stop 100 is closer to image side than the point of the image-side surface 112 of the first lens element 110 on the optical axis to the image side, the value of Dsr2 is negative), the following condition is satisfied: |Dr1s/Dsr2|=0.12.

In the imaging lens assembly according to the 1st embodiment, when the focal length of the imaging lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, the following conditions are satisfied: |f1/f2|=1.14; |f1/f3|=0.26; f4/f5=−1.15; f/f3=−0.17; |f/f4|+|f/f5|=2.45; and (f/f4)−(f/f5)=−2.45.

In the imaging lens assembly according to the 1st embodiment, when an axial distance between the object-side surface 111 of the first lens element 110 and the image surface 170 is TL, a maximum image height of the imaging lens assembly is ImgH (half of a diagonal length of an effective photosensitive area of the image sensor 180), and the half of a maximum field of view of the imaging lens assembly is HFOV, the following conditions are satisfied: TL/ImgH=1.51; and TL/ImgH+1/tan(HFOV)=2.43.

In the imaging lens assembly according to the 1st embodiment, when the focal length of the imaging lens assembly is f, and a maximum optical effective radius of the image-side surface 152 of the fifth lens element 150 is Y52, the following condition is satisfied: f/Y52=1.16.

The detailed optical data of the 1st embodiment are shown in Table 1 and the aspheric surface data are shown in Table 2 below.

TABLE 1

1st Embodiment
f = 2.19 mm, Fno = 2.25, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.040 | | | | |
| 2 | Lens 1 | 1.619 | ASP | 0.380 | Plastic | 1.545 | 56.1 | 3.30 |
| 3 | | 15.067 | ASP | −0.001 | | | | |
| 4 | Stop | Plano | | 0.181 | | | | |
| 5 | Lens 2 | −4.555 | ASP | 0.534 | Plastic | 1.544 | 56.0 | 2.89 |
| 6 | | −1.219 | ASP | 0.231 | | | | |
| 7 | Lens 3 | −0.450 | ASP | 0.300 | Plastic | 1.669 | 19.5 | −12.61 |
| 8 | | −0.603 | ASP | 0.030 | | | | |
| 9 | Lens 4 | 1.379 | ASP | 0.300 | Plastic | 1.660 | 20.4 | −1.92 |
| 10 | | 0.603 | ASP | 0.030 | | | | |
| 11 | Lens 5 | 0.608 | ASP | 0.532 | Plastic | 1.544 | 56.0 | 1.67 |
| 12 | | 1.271 | ASP | 0.400 | | | | |

TABLE 1-continued

1st Embodiment
f = 2.19 mm, Fno = 2.25, HFOV = 47.5 deg.

| Surface # | | Curvature Radius | Thickness | Material | Index | Abbe # | Focal Length |
|---|---|---|---|---|---|---|---|
| 13 | IR-cut filter | Plano | 0.210 | Glass | 1.517 | 64.2 | — |
| 14 | | Plano | 0.303 | | | | |
| 15 | Image | Plano | — | | | | |

Reference wavelength is 587.6 nm (d-line).
Effective radius of Surface 4 is 0.560 mm.

TABLE 2

| Aspheric Coefficients | | | | | |
|---|---|---|---|---|---|
| Surface # | 2 | 3 | 5 | 6 | 7 |
| k = | 1.0193E+00 | −5.5328E+01 | −6.8970E+01 | −1.8357E+01 | −2.1587E+00 |
| A4 = | −1.0616E−01 | −3.0635E−01 | −5.0290E−01 | −1.3527E+00 | −6.0083E−01 |
| A6 = | −2.9045E−01 | −8.7079E−01 | −2.5805E+00 | 2.4869E+00 | −3.8188E−01 |
| A8 = | 8.4706E−01 | 5.1068E−01 | 1.1665E+01 | −7.8283E+00 | 3.1917E+00 |
| A10 = | −4.4226E+00 | −4.7947E+00 | −5.6171E+01 | 1.3772E+01 | −2.6863E+00 |
| A12 = | | | 8.8610E+01 | −1.0186E+01 | 4.1700E−01 |
| A14 = | | | −4.1566E+01 | 2.5862E+00 | 1.9772E−01 |
| A16 = | | | | | −4.7768E−02 |
| Surface # | 8 | 9 | 10 | 11 | 12 |
| k = | −2.1910E+00 | −2.3965E+00 | −5.3020E+00 | −4.8161E+00 | −7.7491E+00 |
| A4 = | −2.2544E−01 | −5.6143E−01 | −2.8060E−01 | −2.0612E−01 | −3.4072E−02 |
| A6 = | −3.0028E−01 | 8.4651E−01 | 2.6643E−01 | 8.5384E−02 | −2.5672E−02 |
| A8 = | 2.0542E+00 | −1.2130E+00 | −2.4326E−01 | −3.3996E−02 | 2.2341E−02 |
| A10 = | −2.9702E+00 | 1.1020E+00 | 1.3512E−01 | 1.5832E−02 | −7.9231E−03 |
| A12 = | 1.5580E+00 | −6.6753E−01 | −4.2107E−02 | −4.6383E−03 | 1.1257E−03 |
| A14 = | | 2.3568E−01 | 7.0179E−03 | 7.0803E−04 | −1.6041E−05 |
| A16 = | | −3.2583E−02 | −4.9002E−04 | −4.5463E−05 | −5.6953E−06 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the imaging lens assembly according to the 1st embodiment, when the focal length of the first lens element 110 is f1, the focal length of the second lens element 120 is f2, the focal length of the third lens element 130 is f3, the focal length of the fourth lens element 140 is f4, and the focal length of the fifth lens element 150 is f5, the following conditions are satisfied: |f4|<|f1|<|f3|; |f5|<|f1|<|f3|; |f4|<|f2|<|f3|; and |f5|<|f2|<|f3|.

2nd Embodiment

Figure 3:
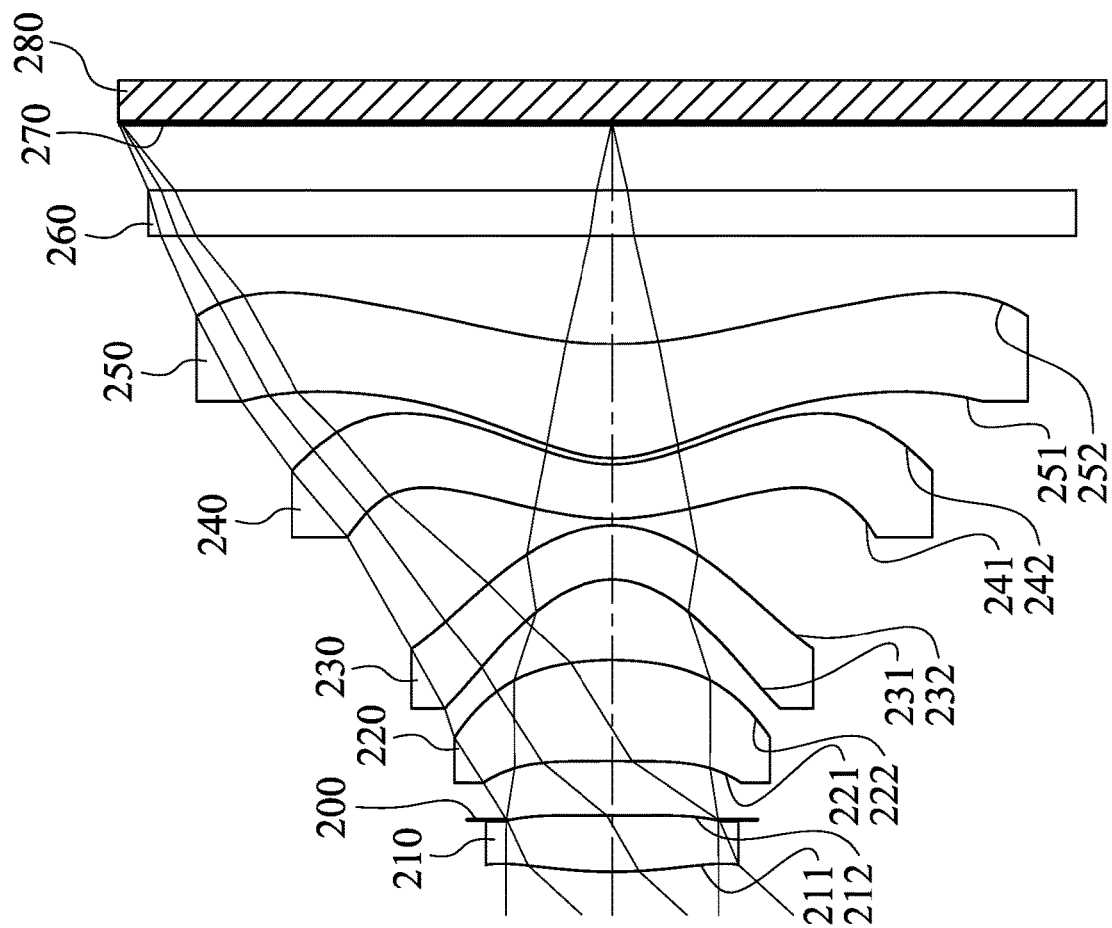
FIG. 3 is a schematic view of an imaging apparatus according to the 2nd embodiment of the present disclosure.
Figure 4:
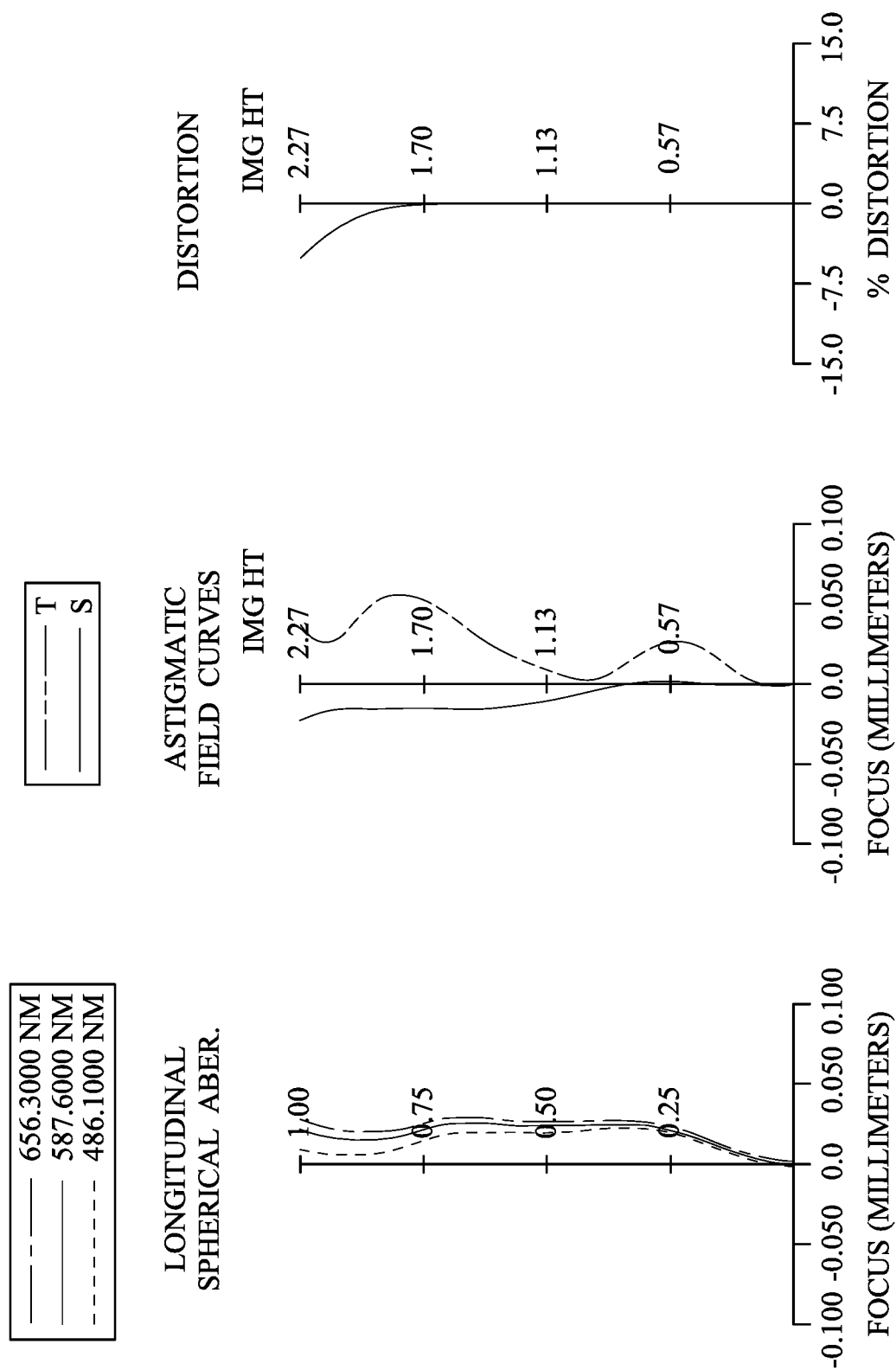
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an imaging lens assembly (its reference numeral is omitted) and an image sensor 280. The imaging lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the image sensor 280 is disposed on the image surface 270 of the imaging lens assembly. The imaging lens assembly includes five lens elements (210, 220, 230, 240 and 250) without additional one or more lens elements inserted between the first lens element 210 and the fifth lens element 250.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric. Furthermore, the image-side surface 212 of the first lens element 210 includes at least one convex critical point in an off-axis region thereof.

The second lens element 220 with positive refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the object-side surface 241 of the fourth lens element 240 includes at least one concave critical point in an off-axis region thereof, and the image-side surface 242 of the fourth lens element 240 includes at least one convex critical point in an off-axis region thereof.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least one convex critical point in an off-axis region thereof.

The IR-cut filter 260 is made of a glass material and located between the fifth lens element 250 and the image surface 270, and will not affect the focal length of the imaging lens assembly.

The detailed optical data of the 2nd embodiment are shown in Table 3 and the aspheric surface data are shown in Table 4 below.

TABLE 3

2nd Embodiment
f = 2.18 mm, Fno = 2.22, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.140 | ASP | 0.259 | Plastic | 1.545 | 56.0 | 4.39 |
| 2 | | 19.526 | ASP | −0.019 | | | | |
| 3 | Ape. Stop | Plano | | 0.271 | | | | |
| 4 | Lens 2 | −12.963 | ASP | 0.465 | Plastic | 1.544 | 55.9 | 2.93 |
| 5 | | −1.438 | ASP | 0.374 | | | | |
| 6 | Lens 3 | −0.395 | ASP | 0.250 | Plastic | 1.669 | 19.5 | −5.43 |
| 7 | | −0.556 | ASP | 0.030 | | | | |
| 8 | Lens 4 | 1.202 | ASP | 0.250 | Plastic | 1.669 | 19.5 | −2.37 |
| 9 | | 0.627 | ASP | 0.030 | | | | |
| 10 | Lens 5 | 0.615 | ASP | 0.527 | Plastic | 1.544 | 56.0 | 1.49 |
| 11 | | 1.770 | ASP | 0.500 | | | | |
| 12 | IR-cut filter | Plano | | 0.210 | Glass | 1.517 | 64.2 | — |
| 13 | | Plano | | 0.310 | | | | |
| 14 | Image | Plano | | — | | | | |

Reference wavelength is 587.6 nm (d-line).

TABLE 4

Aspheric Coefficients

| Surface # | 1 | 2 | 4 | 5 | 6 |
|---|---|---|---|---|---|
| k = | 1.0193E+00 | −5.5328E+01 | −6.8970E+01 | −1.8357E+01 | −2.0656E+00 |
| A4 = | −3.5029E−01 | −2.1963E−01 | −3.7530E−01 | −1.1565E+00 | −1.6136E+00 |
| A6 = | 2.4744E+00 | −4.8750E+00 | −2.1201E+00 | 1.8765E+00 | 4.8876E+00 |
| A8 = | −3.3806E+01 | 5.8692E+01 | 1.5606E+01 | −5.2548E+00 | −9.8214E+00 |
| A10 = | 2.1620E+02 | −4.3839E+02 | −8.5416E+01 | 5.6102E+00 | 1.3130E+01 |
| A12 = | −7.8419E+02 | 1.8034E+03 | 2.1146E+02 | 5.5010E−01 | −9.3042E+00 |
| A14 = | 1.4684E+03 | −3.8245E+03 | −2.1981E+02 | −3.5654E+00 | 3.0607E+00 |
| A16 = | −1.1088E+03 | 3.2696E+03 | 7.9455E+01 | 1.2957E+00 | −3.6331E−01 |

| Surface # | 7 | 8 | 9 | 10 | 11 |
|---|---|---|---|---|---|
| k = | −1.8480E+00 | −1.5852E+00 | −5.3020E+00 | −4.8161E+00 | −7.7491E+00 |
| A4 = | −3.8343E−01 | −4.4949E−01 | −7.2293E−02 | −7.8658E−02 | −4.9399E−02 |
| A6 = | 3.7815E−01 | 7.1821E−01 | −1.3331E−01 | −1.2854E−01 | 9.1664E−03 |
| A8 = | 1.0296E+00 | −1.2837E+00 | 1.5301E−01 | 1.8751E−01 | 8.9257E−03 |
| A10 = | −2.0284E+00 | 1.4665E+00 | −9.8596E−02 | −1.0365E−01 | −6.4680E−03 |
| A12 = | 7.0802E−01 | −1.0333E+00 | 3.3217E−02 | 2.8523E−02 | 1.5494E−03 |
| A14 = | 4.4603E−01 | 3.6909E−01 | −5.0713E−03 | −3.8485E−03 | −1.6927E−04 |
| A16 = | −1.1045E−01 | −4.7929E−02 | 2.6498E−04 | 2.0051E−04 | 7.3464E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.18 | $|f1/f2|$ | 1.50 |
| Fno | 2.22 | $|f1/f3|$ | 0.81 |
| HFOV [deg.] | 47.5 | f4/f5 | −1.59 |
| FOV [deg.] | 95.00 | f/f3 | −0.40 |
| (V1 + V2)/(V3 + V4) | 2.87 | $|f/f4| + |f/f5|$ | 2.38 |
| V3 + V4 | 39.0 | (f/f4) − (f/f5) | −2.38 |
| (R3 + R4)/(R3 − R4) | 1.25 | TL/ImgH | 1.52 |
| $(|R5| + |R6|)/f$ | 0.44 | TL/ImgH + 1/tan(HFOV) | 2.44 |
| $(|R7| + |R8|)/f$ | 0.84 | f/Y52 | 1.14 |
| $|Dr1s/Dsr2|$ | 12.63 | | |

Furthermore, in the imaging lens assembly according to the 2nd embodiment, when the focal length of the first lens element 210 is f1, the focal length of the second lens element 220 is f2, the focal length of the third lens element 230 is f3, the focal length of the fourth lens element 240 is f4, and the focal length of the fifth lens element 250 is f5, the following conditions are satisfied: $|f4|<|f1|<|f3|$; $|f5|<|f1|<|f3|$; $|f4|<|f2|<|f3|$; and $|f5|<|f2|<|f3|$.

3rd Embodiment

Figure 5:
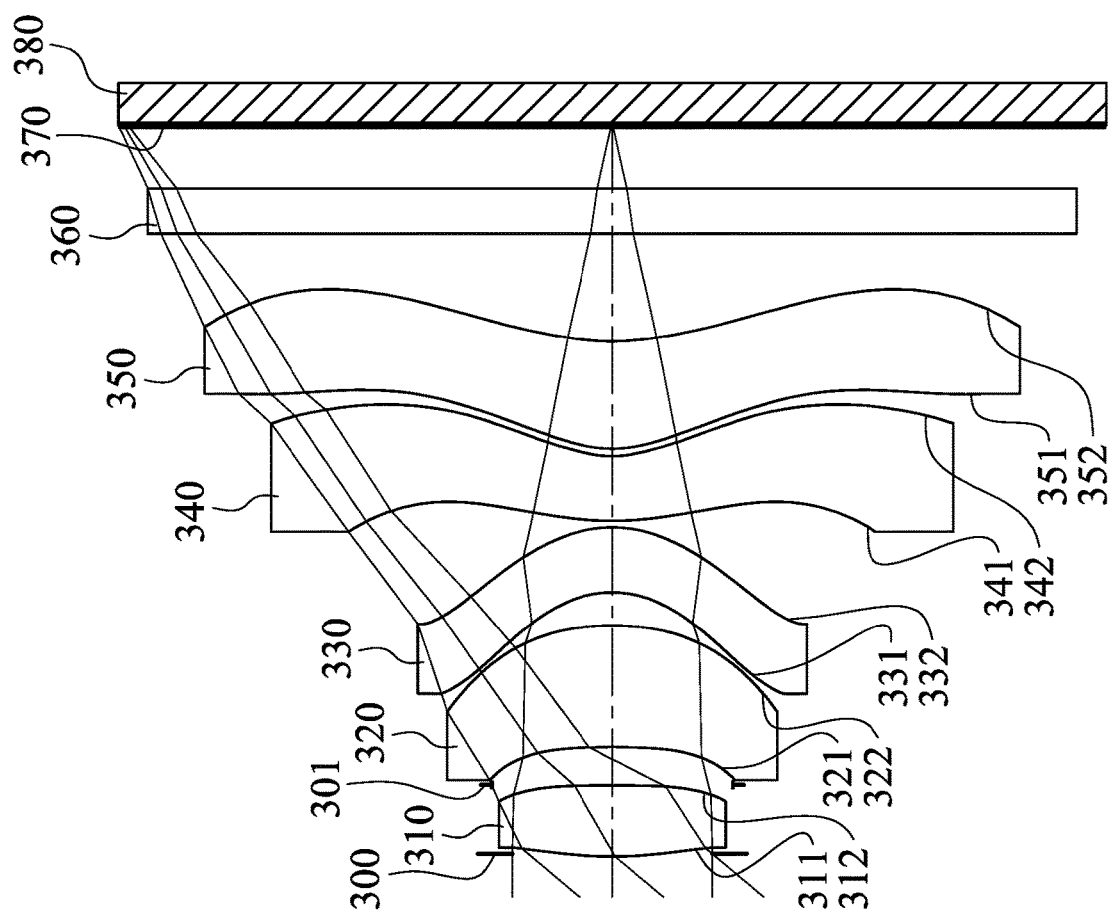
FIG. 5 is a schematic view of an imaging apparatus according to the 3rd embodiment of the present disclosure.
Figure 6:
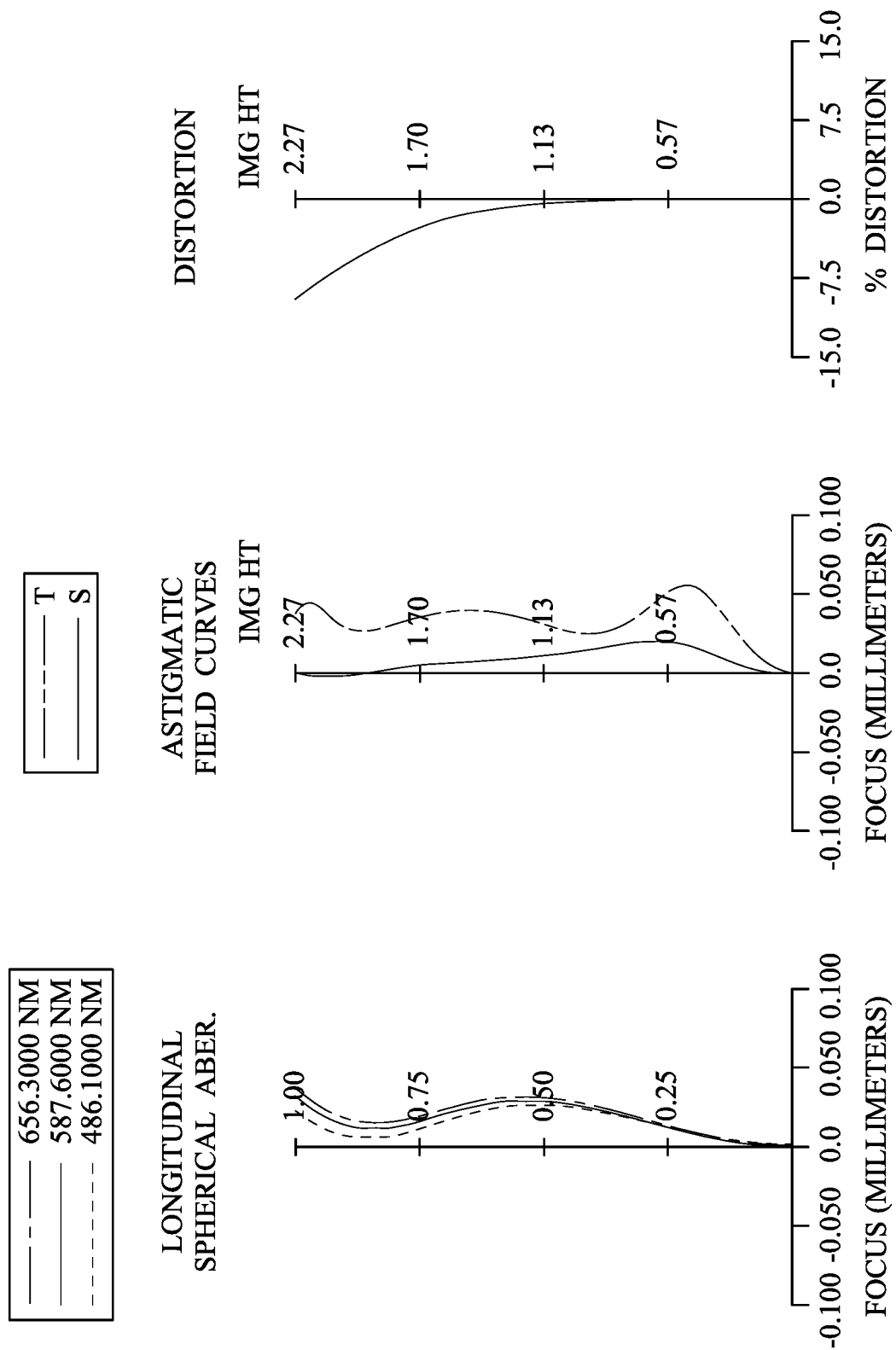
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an imaging lens assembly (its reference numeral is omitted) and an image sensor 380. The imaging lens assembly includes, in order from an object side to an image side, an aperture stop 300, a first lens element 310, a stop 301, a second lens element 320, a third lens element 330, a fourth lens element 340, a fifth lens element 350, an IR-cut filter 360 and an image surface 370, wherein the image sensor 380 is disposed on the image surface 370 of the imaging lens assembly. The imaging lens assembly includes five lens elements (310, 320, 330, 340 and 350) without additional one or more lens elements inserted between the first lens element 310 and the fifth lens element 350.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the object-side surface 341 of the fourth lens element 340 includes at least one concave critical point in an off-axis region thereof, and the image-side surface 342 of the fourth lens element 340 includes at least one convex critical point in an off-axis region thereof.

The fifth lens element 350 with positive refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one convex critical point in an off-axis region thereof.

The IR-cut filter 360 is made of a glass material and located between the fifth lens element 350 and the image surface 370, and will not affect the focal length of the imaging lens assembly.

The detailed optical data of the 3rd embodiment are shown in Table 5 and the aspheric surface data are shown in Table 6 below.

TABLE 5

3rd Embodiment
f = 2.09 mm, Fno = 2.25, HFOV = 50.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.012 | | | | |
| 2 | Lens 1 | 2.009 ASP | 0.330 | Plastic | 1.544 | 55.9 | 2.94 |
| 3 | | −7.407 ASP | 0.002 | | | | |
| 4 | Stop | Plano | 0.176 | | | | |
| 5 | Lens 2 | −2.992 ASP | 0.565 | Plastic | 1.544 | 55.9 | 3.24 |
| 6 | | −1.183 ASP | 0.155 | | | | |
| 7 | Lens 3 | −0.475 ASP | 0.302 | Plastic | 1.660 | 20.4 | 16.93 |
| 8 | | −0.571 ASP | 0.030 | | | | |
| 9 | Lens 4 | 1.594 ASP | 0.300 | Plastic | 1.660 | 20.4 | −1.44 |
| 10 | | 0.551 ASP | 0.034 | | | | |
| 11 | Lens 5 | 0.562 ASP | 0.500 | Plastic | 1.544 | 55.9 | 1.47 |

TABLE 5-continued

3rd Embodiment
f = 2.09 mm, Fno = 2.25, HFOV = 50.0 deg.

| Surface # | | Curvature Radius | Thickness | Material | Index | Abbe # | Focal Length |
|---|---|---|---|---|---|---|---|
| 12 | | 1.299 ASP | 0.500 | | | | |
| 13 | IR-cut filter | Plano | 0.210 | Glass | 1.517 | 64.2 | — |
| 14 | | Plano | 0.293 | | | | |
| 15 | Image | Plano | — | | | | |

Reference wavelength is 587.6 nm (d-line).
Effective radius of Surface 4 is 0.560 mm.

TABLE 6

Aspheric Coefficients

| Surface # | 2 | 3 | 5 | 6 | 7 |
|---|---|---|---|---|---|
| k = | 8.5017E−01 | −6.7961E+01 | −7.7490E+01 | −1.9667E+01 | −1.9727E+00 |
| A4 = | −1.5778E−01 | −4.3776E−01 | −8.5737E+01 | −1.5214E+00 | −1.0923E+00 |
| A6 = | −7.1393E−01 | −9.6072E−01 | 9.3357E−02 | 2.1848E+00 | 2.4193E+00 |
| A8 = | 2.4351E+00 | 9.8665E−02 | 5.5133E−01 | −1.6514E+00 | −1.6779E+00 |
| A10 = | −1.1072E+01 | −2.9407E+00 | −2.5748E+01 | −7.3809E−01 | 1.6013E+00 |
| A12 = | | | 5.8337E+01 | 1.5877E+00 | −1.8571E+00 |
| A14 = | | | −3.2228E+01 | −5.1284E−01 | 8.5569E−01 |
| A16 = | | | | | −1.2251E−01 |

| Surface # | 8 | 9 | 10 | 11 | 12 |
|---|---|---|---|---|---|
| k = | −2.7726E+00 | −1.0000E+00 | −5.2535E+00 | −4.8179E+00 | −8.1416E+00 |
| A4 = | −7.2731E−01 | −2.1920E−01 | −1.3316E−01 | −1.8894E−01 | −6.3544E−03 |
| A6 = | 1.5257E+00 | −2.7033E−01 | −1.1803E−01 | 1.1186E−01 | −2.6860E−02 |
| A8 = | −1.8504E+00 | 3.9291E−01 | 2.2550E−01 | −6.6405E−02 | 7.0059E−03 |
| A10 = | 1.7061E+00 | −1.9076E−01 | −1.5062E−01 | 3.1729E−02 | 9.5399E−04 |
| A12 = | −5.5031E−01 | 1.7820E−02 | 5.1920E−02 | −8.7741E−03 | −9.9659E−04 |
| A14 = | | 1.2101E−02 | −9.0997E−03 | 1.2380E−03 | 2.1521E−04 |
| A16 = | | −2.6620E−03 | 6.2899E−04 | −6.9806E−05 | −1.4900E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.09 | |f1/f2| | 0.91 |
| Fno | 2.25 | |f1/f3| | 0.17 |
| HFOV [deg.] | 50.0 | f4/f5 | −0.98 |
| FOV [deg.] | 100.00 | f/f3 | 0.12 |
| (V1 + V2)/(V3 + V4) | 2.74 | |f/f4| + |f/f5| | 2.87 |
| V3 + V4 | 40.8 | (f/f4) − (f/f5) | −2.87 |
| (R3 + R4)/(R3 − R4) | 2.31 | TL/ImgH | 1.50 |
| (|R5| + |R6|)/f | 0.50 | TL/ImgH + 1/tan(HFOV) | 2.34 |
| (|R7| + |R8|)/f | 1.03 | f/Y52 | 1.10 |
| |Dr1s/Dsr2| | 0.04 | | |

Furthermore, in the imaging lens assembly according to the 3rd embodiment, when the focal length of the first lens element 310 is f1, the focal length of the second lens element 320 is f2, the focal length of the third lens element 330 is f3, the focal length of the fourth lens element 340 is f4, and the focal length of the fifth lens element 350 is f5, the following conditions are satisfied: |f4|<|f1|<|f3|; |f5|<<|f3|; |f4|<|f2|<|f3|; and |f5|<|f2|<|f3|.

4th Embodiment

Figure 7:
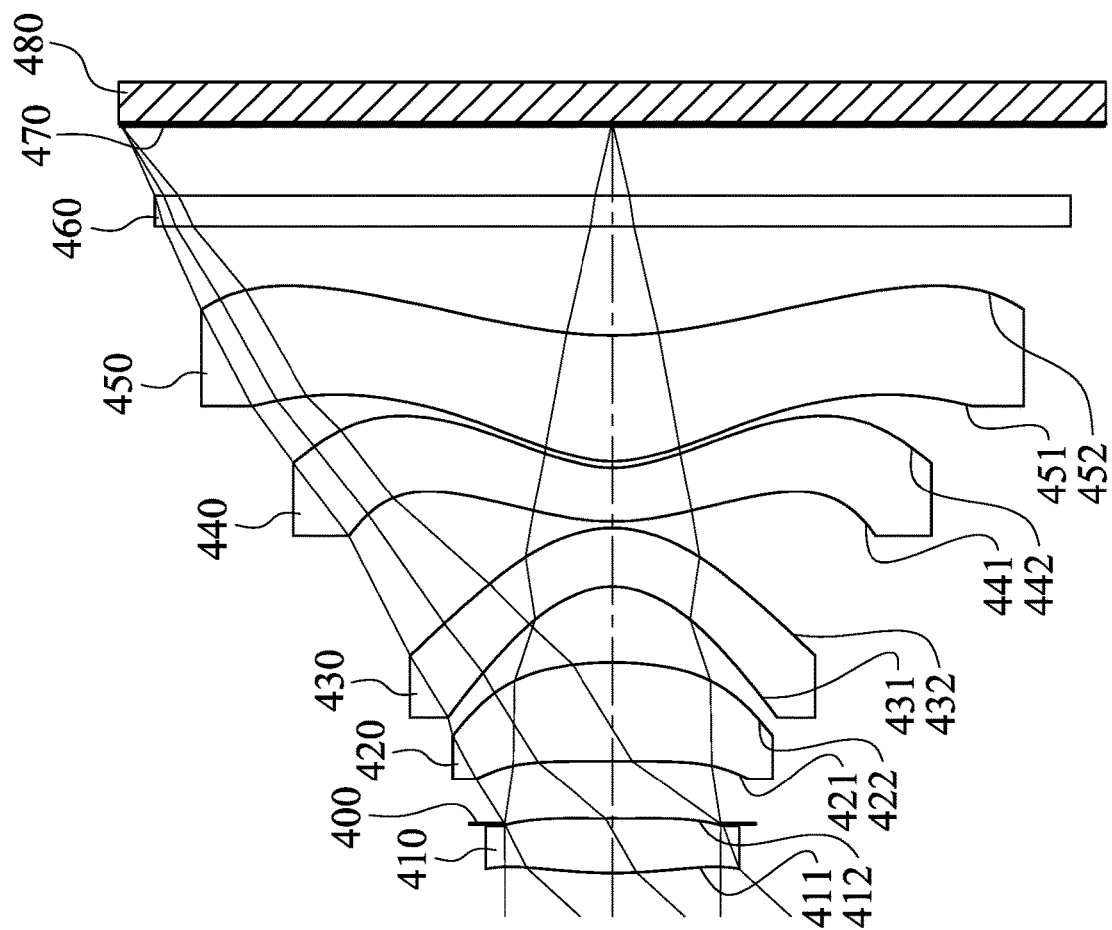
FIG. 7 is a schematic view of an imaging apparatus according to the 4th embodiment of the present disclosure.
Figure 8:
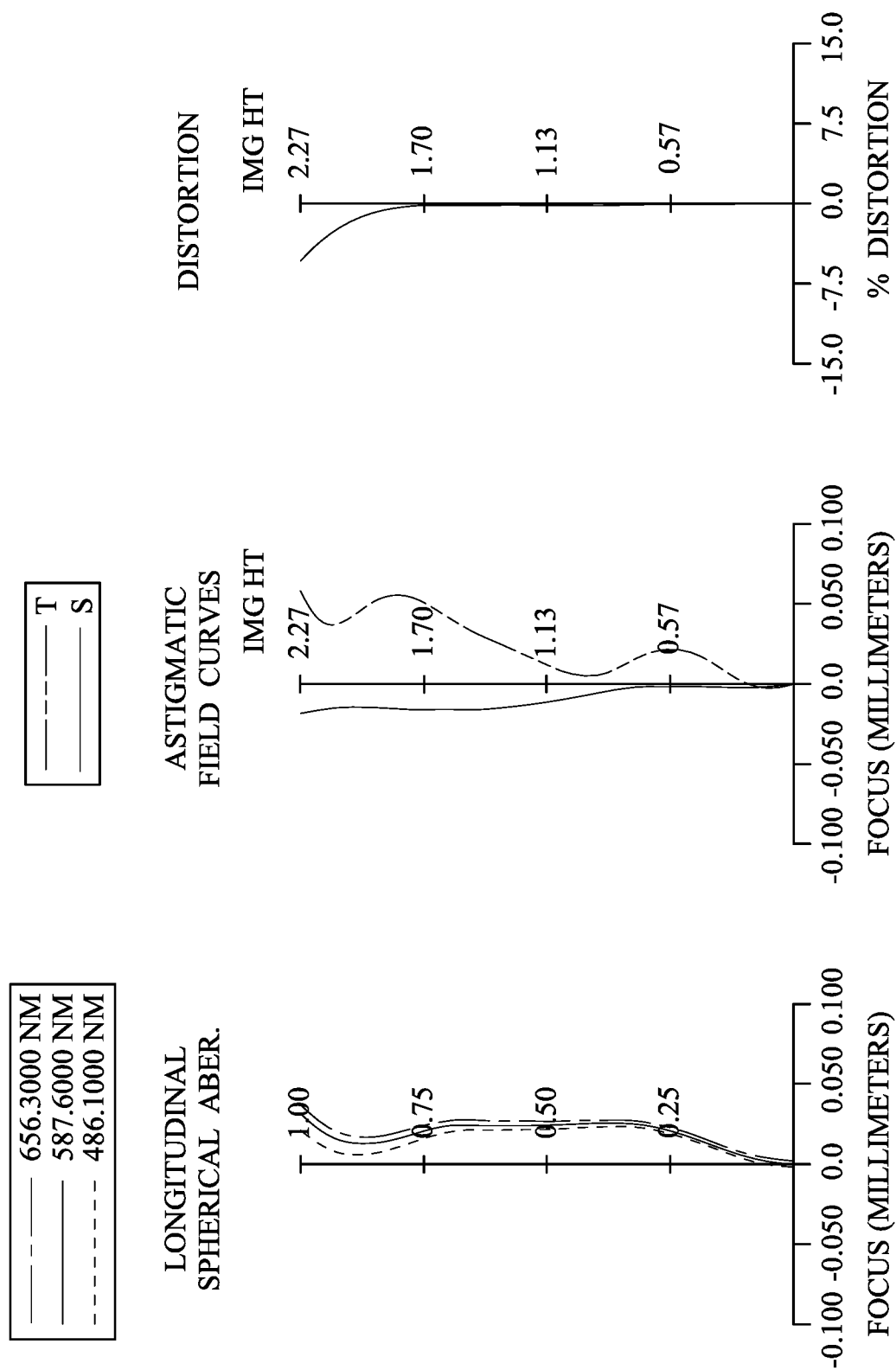
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an imaging lens assembly (its reference numeral is omitted) and an image sensor 480. The imaging lens assembly includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the imaging lens assembly. The imaging lens assembly includes five lens elements (410, 420, 430, 440 and 450) without additional one or more lens elements inserted between the first lens element 410 and the fifth lens element 450.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

Furthermore, the image-side surface 412 of the first lens element 410 includes at least one convex critical point in an off-axis region thereof.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the object-side surface 441 of the fourth lens element 440 includes at least one concave critical point in an off-axis region thereof, and the image-side surface 442 of the fourth lens element 440 includes at least one convex critical point in an off-axis region thereof.

The fifth lens element 450 with positive refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex critical point in an off-axis region thereof.

The IR-cut filter 460 is made of a glass material and located between the fifth lens element 450 and the image surface 470, and will not affect the focal length of the imaging lens assembly.

The detailed optical data of the 4th embodiment are shown in Table 7 and the aspheric surface data are shown in Table 8 below.

TABLE 7

4th Embodiment
f = 2.18 mm, Fno = 2.20, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.297 | ASP | 0.252 | Plastic | 1.545 | 56.0 | 4.49 |
| 2 | | 35.971 | ASP | −0.026 | | | | |
| 3 | Ape. Stop | Plano | | 0.291 | | | | |
| 4 | Lens 2 | 45.224 | ASP | 0.456 | Plastic | 1.544 | 55.9 | 2.87 |
| 5 | | −1.610 | ASP | 0.348 | | | | |
| 6 | Lens 3 | −0.394 | ASP | 0.270 | Plastic | 1.669 | 19.5 | −5.67 |
| 7 | | −0.560 | ASP | 0.030 | | | | |
| 8 | Lens 4 | 1.114 | ASP | 0.250 | Plastic | 1.669 | 19.5 | −2.32 |
| 9 | | 0.591 | ASP | 0.030 | | | | |
| 10 | Lens 5 | 0.631 | ASP | 0.580 | Plastic | 1.544 | 55.9 | 1.49 |
| 11 | | 1.944 | ASP | 0.500 | | | | |
| 12 | IR-cut filter | Plano | | 0.145 | Glass | 1.517 | 64.2 | — |
| 13 | | Plano | | 0.328 | | | | |
| 14 | Image | Plano | | — | | | | |

Reference wavelength is 587.6 nm (d-line).

TABLE 8

Aspheric Coefficients

| Surface # | 1 | 2 | 4 | 5 | 6 |
|---|---|---|---|---|---|
| k = | 1.0195E+00 | −5.5328E+01 | −6.8970E+01 | −1.8357E+01 | −2.1022E+00 |
| A4 = | −4.1061E−01 | −3.2650E−01 | −3.7354E−01 | −9.1364E−01 | −1.0263E+00 |
| A6 = | 2.6601E+00 | −3.2278E+00 | −1.6940E+00 | 4.6751E−01 | 8.8212E−02 |
| A8 = | −3.5769E+01 | 3.0443E+01 | 1.3226E+01 | −1.1267E−01 | 6.1714E+00 |
| A10 = | 2.2211E+02 | −1.8701E+02 | −7.3661E+01 | −6.1266E+00 | −1.3377E+01 |
| A12 = | −7.8633E+02 | 6.0612E+02 | 1.9103E+02 | 1.7026E+01 | 1.1481E+01 |
| A14 = | 1.4478E+03 | −9.1001E+02 | −2.0478E+02 | −1.4834E+01 | −4.2062E+00 |
| A16 = | −1.0779E+03 | 4.3713E+02 | 7.4902E+01 | 4.0925E+00 | 5.3353E−01 |

| Surface # | 7 | 8 | 9 | 10 | 11 |
|---|---|---|---|---|---|
| k = | −1.8542E+00 | −1.8563E+00 | −5.3020E+00 | −4.8161E+00 | −7.7491E+00 |
| A4 = | 7.5886E−02 | −5.5397E−01 | −7.9876E−02 | −8.1130E−02 | −3.3001E−02 |
| A6 = | −2.2439E+00 | 8.9419E−01 | −1.5218E−01 | −7.4025E−02 | 2.1171E−04 |
| A8 = | 7.9854E+00 | −1.4181E+00 | 2.1200E−01 | 1.1499E−01 | 8.0331E−03 |
| A10 = | −1.2587E+01 | 1.5052E+00 | −15449E−01 | −6.6046E−02 | −5.2279E−03 |
| A12 = | 1.0656E+01 | −1.0146E+00 | 5.9576E−02 | 1.9027E−02 | 1.3501E−03 |
| A14 = | −5.4060E+00 | 3.5688E−01 | −1.1074E−02 | −2.6714E−03 | −1.7099E−04 |
| A16 = | 1.5214E+00 | −4.6742E−02 | 7.8376E−04 | 1.4272E−04 | 8.8369E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.18 | \|f1/f2\| | 1.56 |
| Fno | 2.20 | \|f1/f3\| | 0.79 |
| HFOV [deg.] | 47.5 | f4/f5 | −1.56 |
| FOV [deg.] | 95.00 | f/f3 | −0.38 |
| (V1 + V2)/(V3 + V4) | 2.87 | \|f/f4\| + \|f/f5\| | 2.40 |
| V3 + V4 | 39.0 | (f/f4) − (f/f5) | −2.40 |
| (R3 + R4)/(R3 − R4) | 0.93 | TL/ImgH | 1.52 |
| (\|R5\| + \|R6\|)/f | 0.44 | TL/ImgH + 1/tan(HFOV) | 2.44 |
| (\|R7\| + \|R8\|)/f | 0.78 | f/Y52 | 1.15 |
| \|Dr1s/Dsr2\| | 8.69 | | |

Furthermore, in the imaging lens assembly according to the 4th embodiment, when the focal length of the first lens element 410 is f1, the focal length of the second lens element 420 is f2, the focal length of the third lens element 430 is f3, the focal length of the fourth lens element 440 is f4, and the focal length of the fifth lens element 450 is f5, the following conditions are satisfied: |f4|<|f1|<|f3|; |f5|<|f1|<|f3|; |f4|<|f2|<|f3|; and |f5|<|f2|<|f3|.

5th Embodiment

Figure 9:
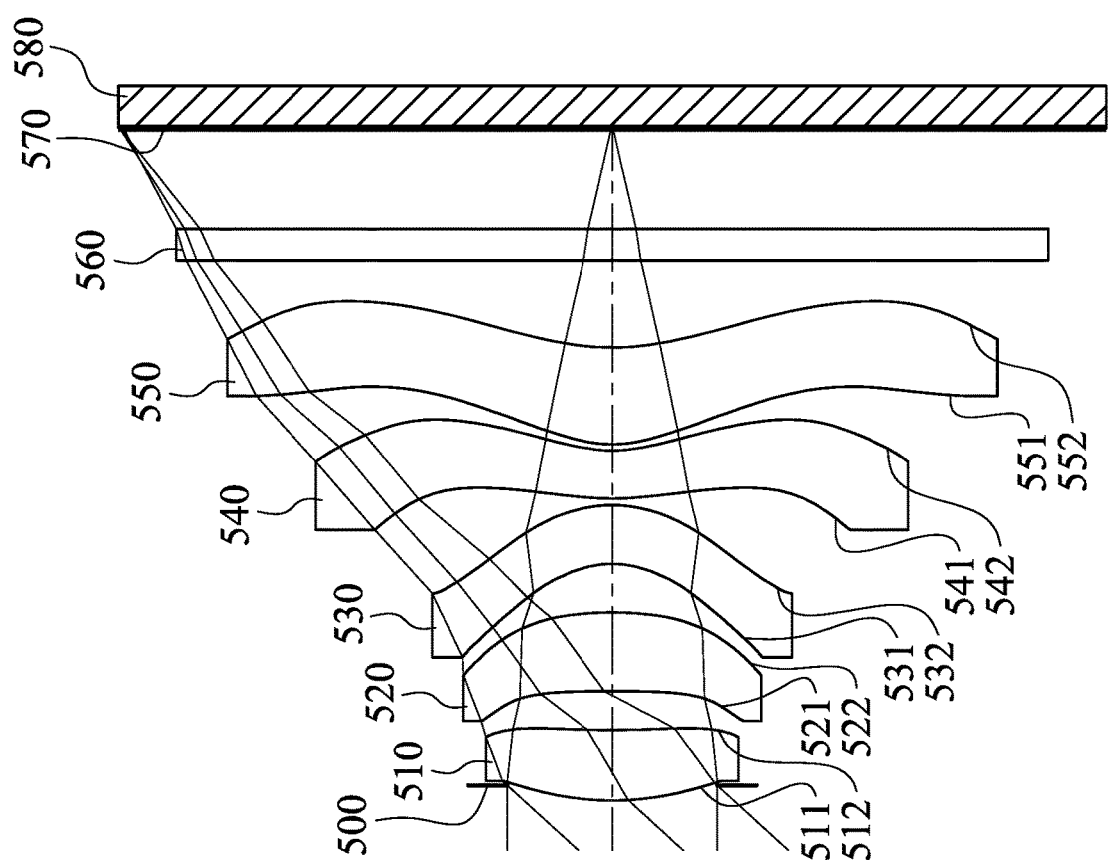
FIG. 9 is a schematic view of an imaging apparatus according to the 5th embodiment of the present disclosure.
Figure 10:
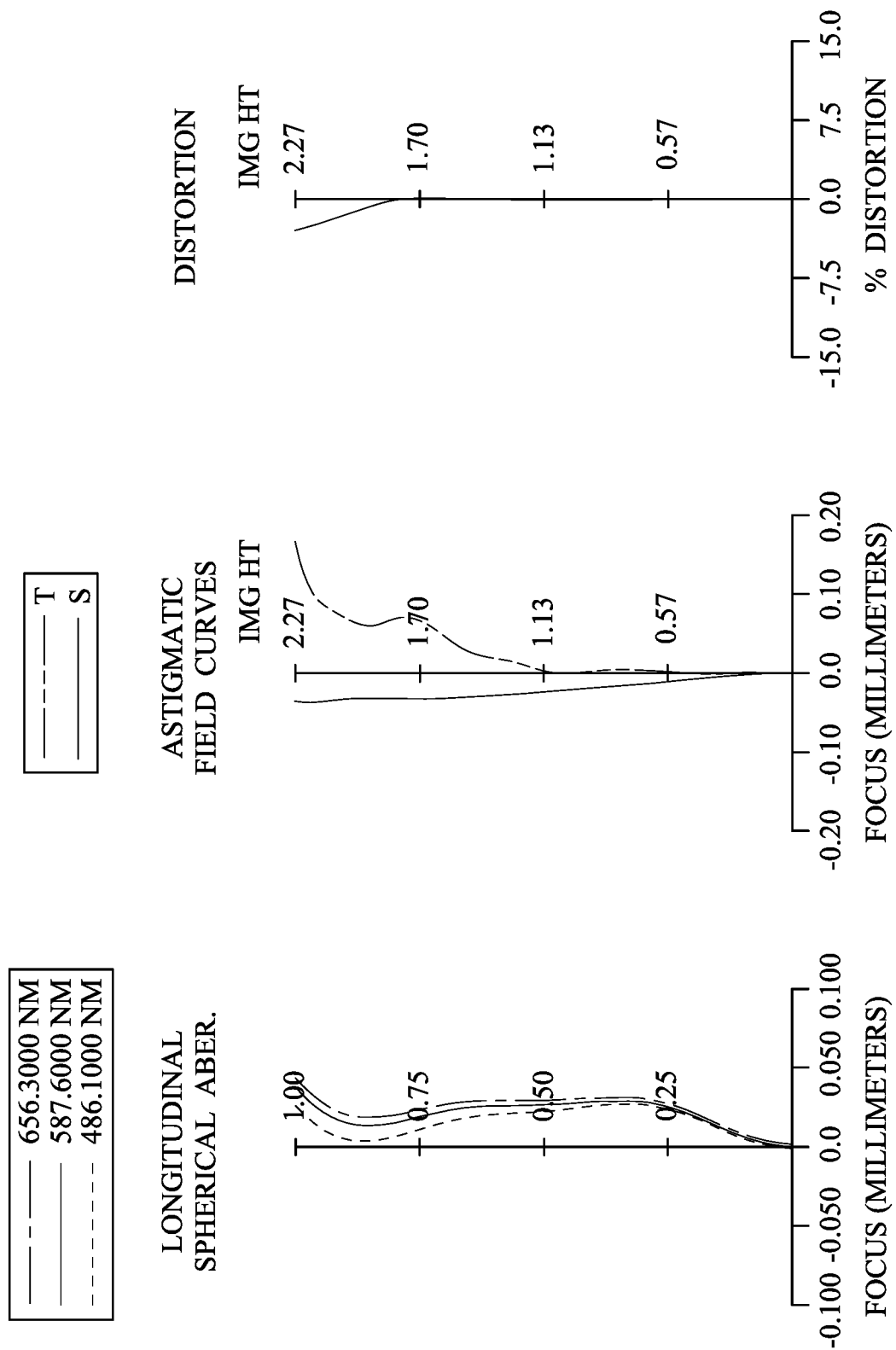
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an imaging lens assembly (its reference numeral is omitted) and an image sensor 580. The imaging lens assembly includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the image sensor 580 is disposed on the image surface 570 of the imaging lens assembly. The imaging lens assembly includes five lens elements (510, 520, 530, 540 and 550) without additional one or more lens elements inserted between the first lens element 510 and the fifth lens element 550.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, the image-side surface 512 of the first lens element 510 includes at least one convex critical point in an off-axis region thereof.

The second lens element 520 with positive refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the object-side surface 541 of the fourth lens element 540 includes at least one concave critical point in an off-axis region thereof, and the image-side surface 542 of the fourth lens element 540 includes at least one convex critical point in an off-axis region thereof.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least one convex critical point in an off-axis region thereof.

The IR-cut filter 560 is made of a glass material and located between the fifth lens element 550 and the image surface 570, and will not affect the focal length of the imaging lens assembly.

The detailed optical data of the 5th embodiment are shown in Table 9 and the aspheric surface data are shown in Table 10 below.

TABLE 9

5th Embodiment
f = 2.13 mm, Fno = 2.20, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.070 | | | | |
| 2 | Lens 1 | 1.288 | ASP | 0.327 | Plastic | 1.544 | 55.9 | 3.20 |
| 3 | | 4.504 | ASP | 0.179 | | | | |
| 4 | Lens 2 | −8.302 | ASP | 0.362 | Plastic | 1.511 | 56.8 | 3.65 |
| 5 | | −1.547 | ASP | 0.223 | | | | |
| 6 | Lens 3 | −0.473 | ASP | 0.271 | Plastic | 1.669 | 19.5 | −7.34 |
| 7 | | −0.644 | ASP | 0.030 | | | | |
| 8 | Lens 4 | 1.268 | ASP | 0.222 | Plastic | 1.669 | 19.5 | −2.47 |

TABLE 9-continued

5th Embodiment
f = 2.13 mm, Fno = 2.20, HFOV = 47.5 deg.

| Surface # | | Curvature Radius | | Thickness | Material | Index | Abbe # | Focal Length |
|---|---|---|---|---|---|---|---|---|
| 9 | | 0.667 | ASP | 0.030 | | | | |
| 10 | Lens 5 | 0.595 | ASP | 0.446 | Plastic | 1.544 | 55.9 | 1.72 |
| 11 | | 1.195 | ASP | 0.400 | | | | |
| 12 | IR-cut filter | Plano | | 0.145 | Glass | 1.517 | 64.2 | — |
| 13 | | Plano | | 0.466 | | | | |
| 14 | Image | Plano | | — | | | | |

Reference wavelength is 587.6 nm (d-line).

TABLE 10

Aspheric Coefficients

| Surface # | 2 | 3 | 4 | 5 | 6 |
|---|---|---|---|---|---|
| k = | 9.8559E−01 | −5.5328E+01 | −6.8970E+01 | −1.8365E+01 | −2.4573E+00 |
| A4 = | −4.4900E−01 | −1.7498E−02 | −2.1518E−01 | −9.1472E−01 | −6.6745E−01 |
| A6 = | 8.3355E+00 | −3.3776E+00 | −7.1022E+00 | −2.3392E−01 | −5.5249E+00 |
| A8 = | −1.2012E+02 | 1.7647E+01 | 5.7429E+01 | −2.8998E+00 | 3.7948E+01 |
| A10 = | 9.4253E+02 | −7.3105E+01 | −3.1197E+02 | 1.9931E+01 | −8.3454E+01 |
| A12 = | −4.2395E+03 | 1.4205E+02 | 8.1693E+02 | −3.8358E+01 | 7.7365E+01 |
| A14 = | 1.0133E+04 | −1.3223E+02 | −9.0772E+02 | 3.0028E+01 | −3.0400E+01 |
| A16 = | −1.0048E+04 | 8.6766E+01 | 3.4741E+02 | −8.1844E+00 | 4.0495E+00 |

| Surface # | 7 | 8 | 9 | 10 | 11 |
|---|---|---|---|---|---|
| k = | −1.8709E+00 | −7.0176E+00 | −5.1196E+00 | −4.8061E+00 | −7.8490E+00 |
| A4 = | −7.9434E−01 | −1.1222E+00 | −8.2539E−01 | −2.0392E−01 | 3.9592E−02 |
| A6 = | 2.0191E+00 | 3.2949E+00 | 1.8658E+00 | 1.9965E−01 | −2.2527E−01 |
| A8 = | −5.0517E+00 | −5.8892E+00 | −2.5807E+00 | −2.0693E−01 | 2.2652E−01 |
| A10 = | 2.2733E+01 | 5.7294E+00 | 1.9403E+00 | 1.2776E−01 | −1.1518E−01 |
| A12 = | −5.1827E+01 | −3.1527E+00 | −7.8409E−01 | −4.1455E−02 | 3.0891E−02 |
| A14 = | 5.1039E+01 | 9.3611E−01 | 1.5883E−01 | 6.7079E−03 | −4.1233E−03 |
| A16 = | −1.7360E+01 | −1.1425E−01 | −1.2607E−02 | −4.2938E−04 | 2.1562E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.13 | |f1/f2| | 0.88 |
| Fno | 2.20 | |f1/f3| | 0.44 |
| HFOV [deg.] | 47.5 | f4/f5 | −1.44 |
| FOV [deg.] | 95.00 | f/f3 | −0.29 |
| (V1 + V2)/(V3 + V4) | 2.89 | |f/f4| + |f/f5| | 2.10 |
| V3 + V4 | 39.0 | (f/f4) − (f/f5) | −2.10 |
| (R3 + R4)/(R3 − R4) | 1.46 | TL/ImgH | 1.37 |
| (|R5| + |R6|)/f | 0.52 | TL/ImgH + 1/tan(HFOV) | 2.28 |
| (|R7| + |R8|)/f | 0.91 | f/Y52 | 1.20 |
| |Dr1s/Dsr2| | 0.27 | | |

Furthermore, in the imaging lens assembly according to the 5th embodiment, when the focal length of the first lens element 510 is f1, the focal length of the second lens element 520 is f2, the focal length of the third lens element 530 is f3, the focal length of the fourth lens element 540 is f4, and the focal length of the fifth lens element 550 is f5, the following conditions are satisfied: |f4|<|f1|<|f3|; |f5|<|f1|<|f3|; |f4|<|f2|<|f3|; and |f5|<|f2|<|f3|.

6th Embodiment

Figure 11:
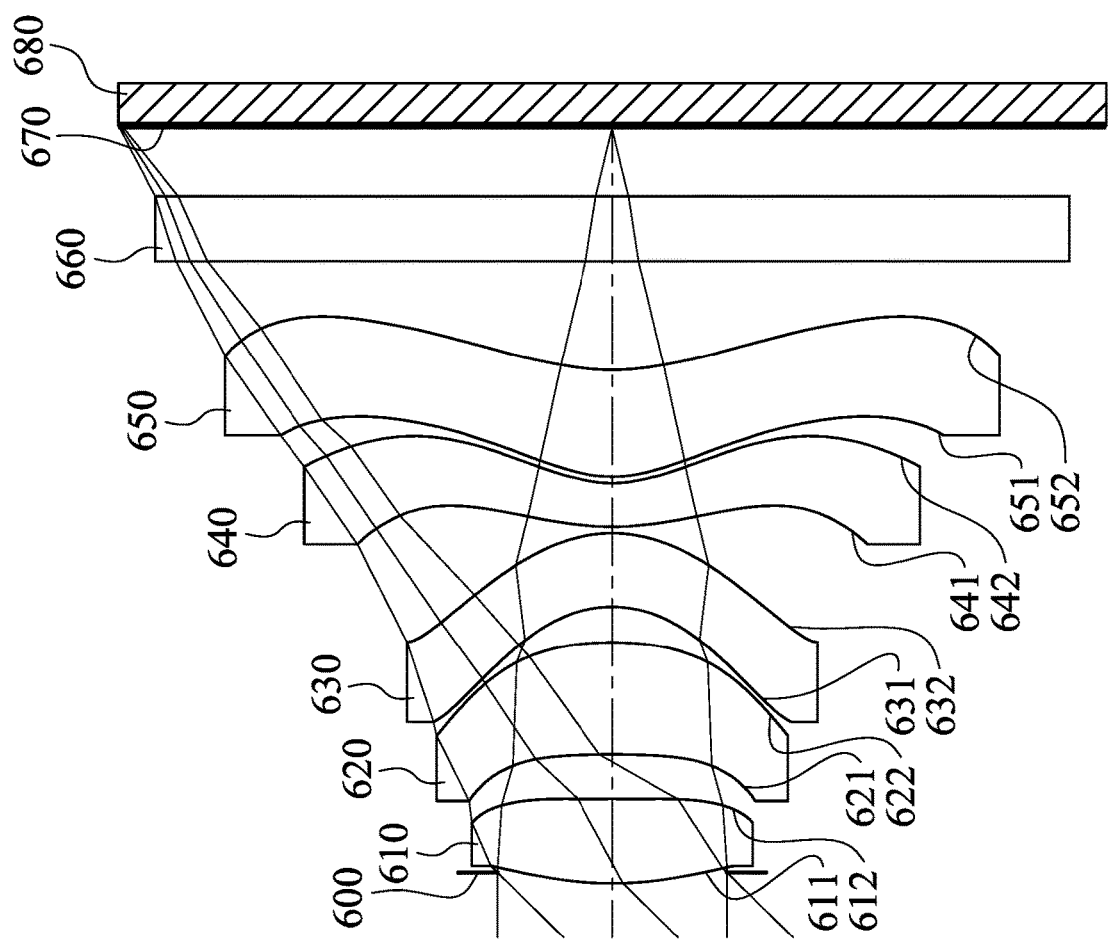
FIG. 11 is a schematic view of an imaging apparatus according to the 6th embodiment of the present disclosure.
Figure 12:
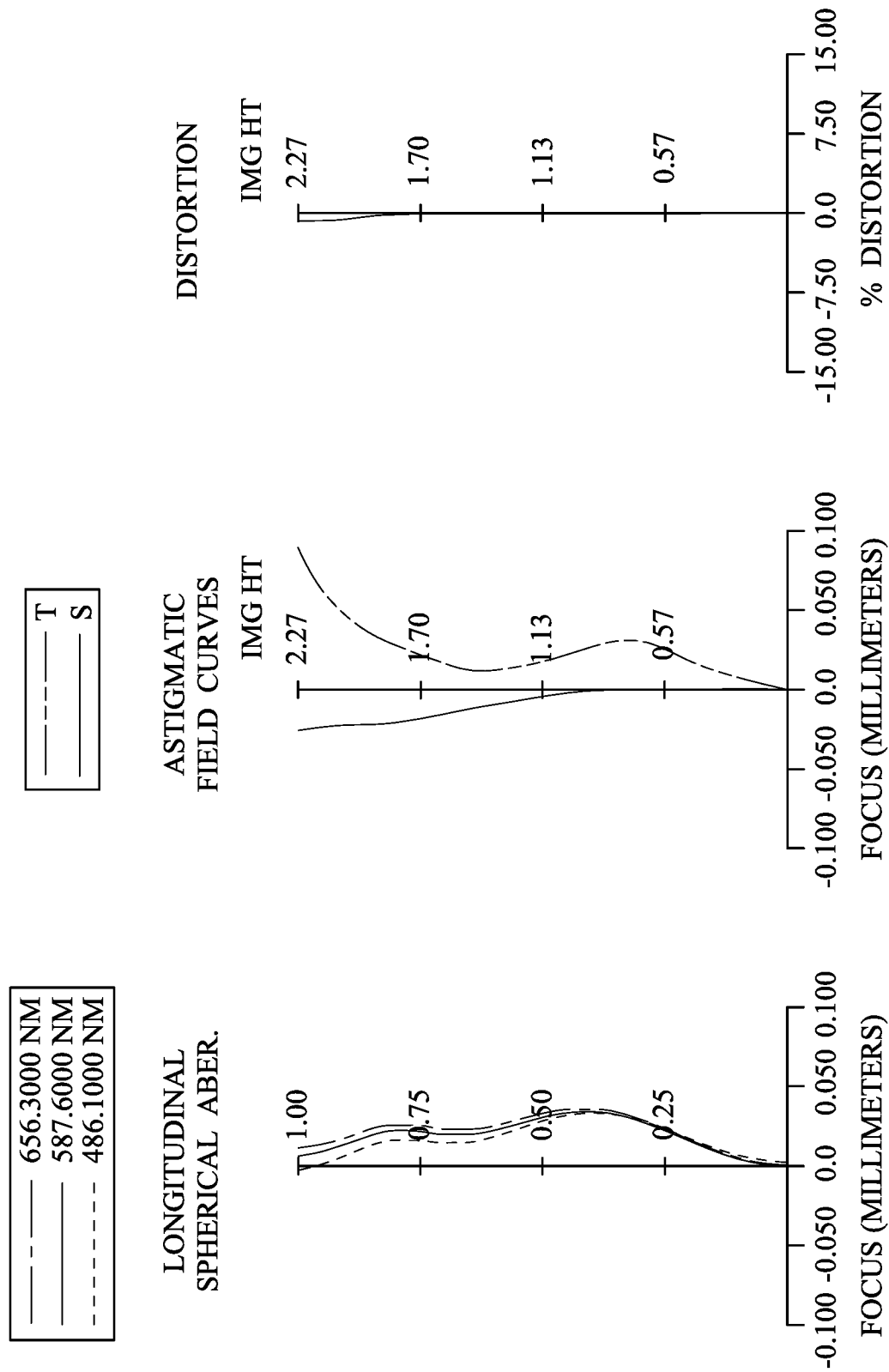
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an imaging lens assembly (its reference numeral is omitted) and an image sensor 680. The imaging lens assembly includes, in order from an object side an image side, an aperture stop 600, a first lens element 610, a second lens element 620, a third lens element 630, a fourth lens element 640, a fifth lens element 650, an IR-cut filter 660 and an image surface 670, wherein the image sensor 680 is disposed on the image surface 670 of the imaging lens assembly. The imaging lens assembly includes five lens elements (610, 620, 630, 640 and 650) without additional one or more lens elements inserted between the first lens element 610 and the fifth lens element 650.

The first lens element 610 with positive refractive power has an object-side surface 611 being convex in a paraxial region thereof and an image-side surface 612 being planar in a paraxial region thereof. The first lens element 610 is made of a plastic material, and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the object-side surface 641 of the fourth lens element 640 includes at least one concave critical point in an off-axis region thereof, and the image-side surface 642 of the fourth lens element 640 includes at least one convex critical point in an off-axis region thereof.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least one convex critical point in an off-axis region thereof.

The IR-cut filter 660 is made of a glass material and located between the fifth lens element 650 and the image surface 670, and will not affect the focal length of the imaging lens assembly.

The detailed optical data of the 6th embodiment are shown in Table 11 and the aspheric surface data are shown in Table 12 below.

TABLE 11

6th Embodiment
f = 2.24 mm, Fno = 2.12, HFOV = 45.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.050 | | | | |
| 2 | Lens 1 | 1.644 | ASP | 0.389 | Plastic | 1.544 | 55.9 | 3.02 |
| 3 | | ∞ | ASP | 0.206 | | | | |
| 4 | Lens 2 | −4.111 | ASP | 0.516 | Plastic | 1.511 | 56.8 | 4.23 |
| 5 | | −1.476 | ASP | 0.165 | | | | |
| 6 | Lens 3 | −0.546 | ASP | 0.339 | Plastic | 1.669 | 19.5 | 36.12 |
| 7 | | −0.667 | ASP | 0.030 | | | | |
| 8 | Lens 4 | 1.369 | ASP | 0.200 | Plastic | 1.669 | 19.5 | −1.82 |
| 9 | | 0.606 | ASP | 0.030 | | | | |
| 10 | Lens 5 | 0.597 | ASP | 0.493 | Plastic | 1.544 | 55.9 | 1.70 |
| 11 | | 1.194 | ASP | 0.500 | | | | |
| 12 | IR-cut filter | Plano | | 0.300 | Glass | 1.517 | 64.2 | — |
| 13 | | Plano | | 0.326 | | | | |
| 14 | Image | Plano | | — | | | | |

Reference wavelength is 587.6 nm (d-line).

TABLE 12

Aspheric Coefficients

| Surface # | 2 | 3 | 4 | 5 | 6 |
|---|---|---|---|---|---|
| k = | 1.6445E+00 | 0.0000E+00 | −3.9670E+01 | −1.5776E+01 | −2.3584E+00 |
| A4 = | −1.8976E−01 | −2.3426E−01 | −6.1748E−01 | −1.4120E+00 | −1.8104E+00 |
| A6 = | 3.9351E−01 | −5.6776E−01 | 1.3706E+00 | 3.1408E+00 | 6.6705E+00 |
| A8 = | 1.7740E+00 | −4.6630E+00 | −1.9664E+01 | −8.7572E+00 | −1.5633E+01 |
| A10 = | −4.8008E+01 | 5.0270E+01 | 1.1003E+02 | 1.4966E+01 | 2.1969E+01 |
| A12 = | 2.2560E+02 | −2.4170E+02 | −3.7929E+02 | −1.2781E+01 | −1.5686E+01 |
| A14 = | −4.1933E+02 | 5.2919E+02 | 6.9021E+02 | 5.1882E+00 | 5.1344E+00 |
| A16 = | 2.2560E+02 | −4.4689E+02 | −5.0075E+02 | −8.0166E−01 | −6.0533E−01 |

| Surface # | 7 | 8 | 9 | 10 | 11 |
|---|---|---|---|---|---|
| k = | −1.7053E+00 | −2.6152E+00 | −3.6124E+00 | −4.0746E+00 | −7.2224E+00 |
| A4 = | −4.8780E−01 | −3.1367E−01 | −4.5464E−01 | −2.9623E−01 | −5.5188E−02 |
| A6 = | 1.6390E+00 | 3.8325E−02 | 5.9928E−01 | 2.8802E−01 | 3.7160E−03 |
| A8 = | −3.0115E+00 | 3.1383E−01 | −6.9400E−01 | −2.1759E−01 | 1.4945E−02 |
| A10 = | 4.1132E+00 | −8.3631E−01 | 4.9198E−01 | 1.2059E−01 | −1.2564E−02 |
| A12 = | −4.4031E+00 | 8.3181E−01 | −1.9378E−01 | −4.5065E−02 | 4.2009E−03 |
| A14 = | 3.0896E+00 | −3.5389E−01 | 3.8947E−02 | 9.2958E−03 | −7.0667E−04 |
| A16 = | −8.5153E−01 | 5.1955E−02 | −3.1018E−03 | −7.6502E−04 | 4.7235E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.24 | \|f1/f2\| | 0.71 |
| Fno | 2.12 | \|f1/f3\| | 0.08 |
| HFOV [deg.] | 45.4 | f4/f5 | −1.07 |
| FOV [deg.] | 90.80 | f/f3 | 0.06 |
| (V1 + V2)/(V3 + V4) | 2.89 | \|f/f4\| + \|f/f5\| | 2.55 |
| V3 + V4 | 39.0 | (f/f4) − (f/f5) | −2.55 |
| (R3 + R4)/(R3 − R4) | 2.12 | TL/ImgH | 1.54 |
| (\|R5\| + \|R6\|)/f | 0.54 | TL/ImgH + 1/tan(HFOV) | 2.53 |
| (\|R7\| + \|R8\|)/f | 0.88 | f/Y52 | 1.26 |
| \|Dr1s/Dsr2\| | 0.15 | | |

Furthermore, in the imaging lens assembly according to the 6th embodiment, when the focal length of the first lens element 610 is f1, the focal length of the second lens element 620 is f2, the focal length of the third lens element 630 is f3, the focal length of the fourth lens element 640 is f4, and the focal length of the fifth lens element 650 is f5, the following conditions are satisfied: $|f4|<|f1|<|f3|$; $|f5|<|f1|<|f3|$; $|f4|<|f2|<|f3|$; and $|f5|<|f2|<|f3|$.

7th Embodiment

Figure 13:
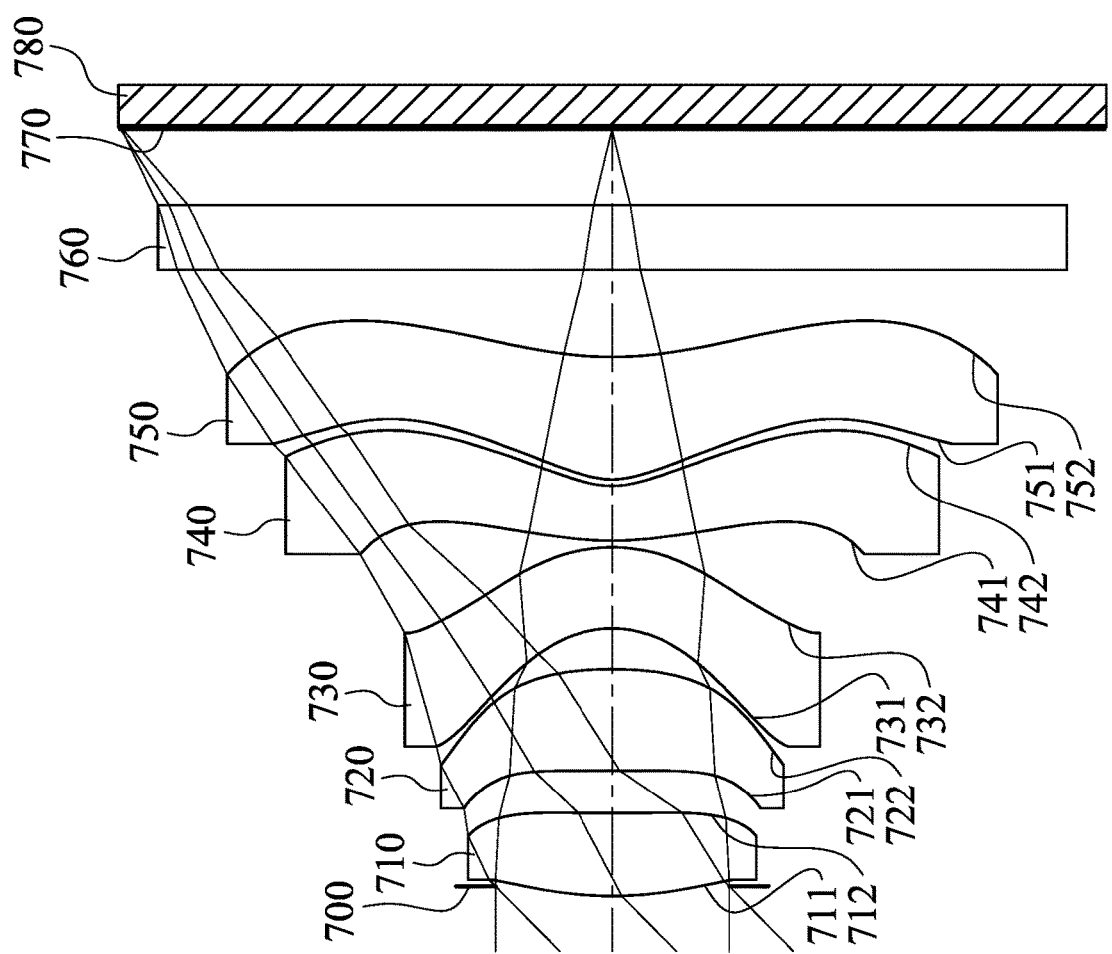
FIG. 13 is a schematic view of an imaging apparatus according to the 7th embodiment of the present disclosure.
Figure 14:
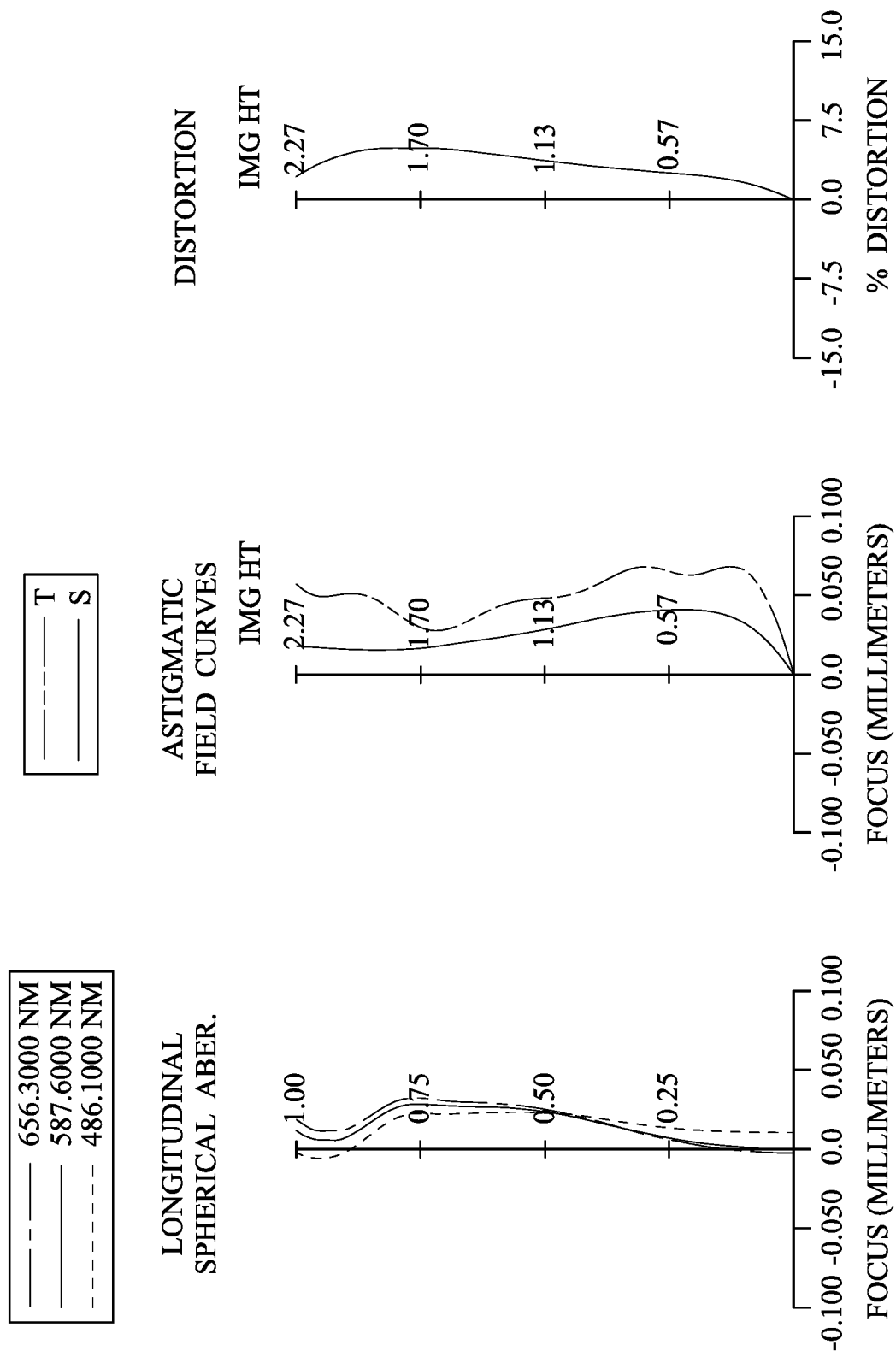
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an imaging lens assembly (its reference numeral is omitted) and an image sensor 780. The imaging lens assembly includes, in order from an object side to an image side, an aperture stop 700, a first lens element 710, a second lens element 720, a third lens element 730, a fourth lens element 740, a fifth lens element 750, an IR-cut filter 760 and an image surface 770, wherein the image sensor 780 is disposed on the image surface 770 of the imaging lens assembly. The imaging lens assembly includes five lens elements (710, 720, 730, 740 and 750) without additional one or more lens elements inserted between the first lens element 710 and the fifth lens element 750.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric. Furthermore, the image-side surface 712 of the first lens element 710 includes at least one convex critical point in an off-axis region thereof.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the object-side surface 741 of the fourth lens element 740 includes at least one concave critical point in an off-axis region thereof, and the image-side surface 742 of the fourth lens element 740 includes at least one convex critical point in an off-axis region thereof.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least one convex critical point in an off-axis region thereof.

The IR-cut filter 760 is made of a glass material and located between the fifth lens element 750 and the image surface 770, and will not affect the focal length of the imaging lens assembly.

The detailed optical data of the 7th embodiment are shown in Table 13 and the aspheric surface data are shown in Table 14 below.

TABLE 13

7th Embodiment
f = 2.24 mm, Fno = 2.08, HFOV = 44.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.046 | | | | |
| 2 | Lens 1 | 1.670 | ASP | 0.382 | Plastic | 1.545 | 56.0 | 3.69 |
| 3 | | 9.040 | ASP | 0.196 | | | | |
| 4 | Lens 2 | 18.676 | ASP | 0.468 | Plastic | 1.544 | 55.9 | 3.01 |
| 5 | | −1.780 | ASP | 0.187 | | | | |
| 6 | Lens 3 | −0.525 | ASP | 0.373 | Plastic | 1.584 | 28.2 | −7.23 |
| 7 | | −0.757 | ASP | 0.030 | | | | |
| 8 | Lens 4 | 1.586 | ASP | 0.254 | Plastic | 1.607 | 26.6 | −0.96 |

TABLE 13-continued

7th Embodiment
f = 2.24 mm, Fno = 2.08, HFOV = 44.6 deg.

| Surface # | | Curvature Radius | | Thickness | Material | Index | Abbe # | Focal Length |
|---|---|---|---|---|---|---|---|---|
| 9 | | 0.401 | ASP | 0.030 | | | | |
| 10 | Lens 5 | 0.378 | ASP | 0.563 | Plastic | 1.544 | 55.9 | 0.78 |
| 11 | | 1.650 | ASP | 0.400 | | | | |
| 12 | IR-cut filter | Plano | | 0.300 | Glass | 1.517 | 64.2 | — |
| 13 | | Plano | | 0.357 | | | | |
| 14 | Image | Plano | | — | | | | |

Reference wavelength is 587.6 nm (d-line).

TABLE 14

Aspheric Coefficients

| Surface # | 2 | 3 | 4 | 5 | 6 |
|---|---|---|---|---|---|
| k = | 9.5993E−01 | 0.0000E+00 | −1.0000E+00 | −1.2605E+01 | −2.2256E+00 |
| A4 = | −5.3312E−02 | −3.8305E−01 | −5.1296E−01 | −1.2008E+00 | −2.2319E+00 |
| A6 = | −1.7455E+00 | 5.3339E−01 | 2.1381E+00 | 2.6418E+00 | 8.3278E+00 |
| A8 = | 1.4733E+01 | −1.1722E+01 | −2.9188E+01 | −1.0682E+01 | −1.9550E+01 |
| A10 = | −7.0949E+01 | 7.1813E+01 | 1.6882E+02 | 1.8832E+01 | 2.8116E+01 |
| A12 = | 1.2736E+02 | −2.6681E+02 | −5.8345E+02 | −1.2935E+01 | −2.0601E+01 |
| A14 = | 6.2522E+01 | 5.2901E+02 | 1.0364E+03 | 2.8791E+00 | 6.8908E+00 |
| A16 = | −3.4963E+02 | −4.2758E+02 | −7.1773E+02 | 6.4235E−02 | −8.2530E−01 |

| Surface # | 7 | 8 | 9 | 10 | 11 |
|---|---|---|---|---|---|
| k = | −2.0735E+00 | −2.1461E+00 | −6.4023E+00 | −5.7495E+00 | −1.0065E+01 |
| A4 = | −5.6109E−01 | −4.0335E−01 | −1.5489E−01 | −1.6039E−01 | −2.1855E−02 |
| A6 = | 1.1288E+00 | 5.0722E−01 | 1.0955E−01 | 1.7704E−01 | −2.1452E−02 |
| A8 = | 4.0166E−01 | −6.8982E−01 | −9.3464E−02 | −2.4331E−01 | −2.6094E−03 |
| A10 = | −1.5227E+00 | 6.2387E−01 | 3.5783E−02 | 1.6407E−01 | 9.5755E−03 |
| A12 = | −7.3678E−01 | −3.6920E−01 | −1.9434E−03 | −5.4629E−02 | −4.3287E−03 |
| A14 = | 2.3079E+00 | 1.1238E−01 | −1.6255E−03 | 8.9024E−03 | 7.5756E−04 |
| A16 = | −9.0283E−01 | −1.3129E−02 | 2.3661E−04 | −5.6951E−04 | −4.6010E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.24 | |f1/f2| | 1.23 |
| Fno | 2.08 | |f1/f3| | 0.51 |
| HFOV [deg.] | 44.6 | f4/f5 | −1.23 |
| FOV [deg.] | 89.20 | f/f3 | −0.31 |
| (V1 + V2)/(V3 + V4) | 2.04 | |f/f4| + |f/f5| | 5.21 |
| V3 + V4 | 54.8 | (f/f4) − (f/f5) | −5.21 |
| (R3 + R4)/(R3 − R4) | 0.83 | TL/ImgH | 1.56 |
| (|R5| + |R6|)/f | 0.57 | TL/ImgH + 1/tan(HFOV) | 2.58 |
| (|R7| + |R8|)/f | 0.89 | f/Y52 | 1.26 |
| |Dr1s/Dsr2| | 0.14 | | |

Furthermore, in the imaging lens assembly according to the 7th embodiment, when the focal length of the first lens element 710 is f1, the focal length of the second lens element 720 is f2, the focal length of the third lens element 730 is f3, the focal length of the fourth lens element 740 is f4, and the focal length of the fifth lens element 750 is f5, the following conditions are satisfied: |f4|<|f1|<|f3|; |f5|<|f3|<|f3|; |f4|<|f2|<|f3|; and |f5|<|f2|<|f3|.

8th Embodiment

Figure 16:
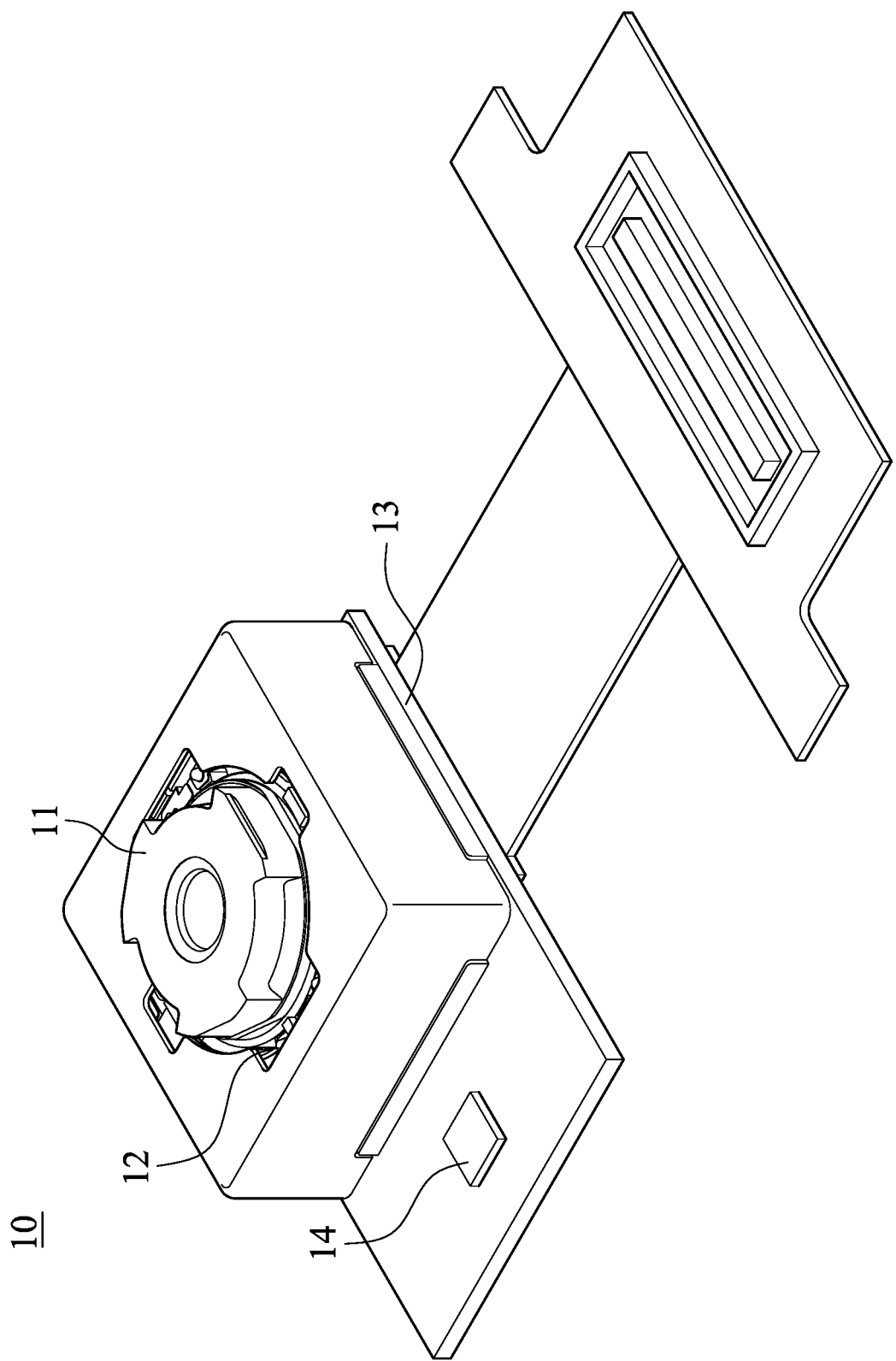
FIG. 16 is a three-dimensional schematic view of an imaging apparatus according to the 8th embodiment of the present disclosure.

FIG. 16 is a three-dimensional schematic view of an imaging apparatus 10 according to the 8th embodiment of the present disclosure. In FIG. 16, the imaging apparatus 10 of the 8th embodiment is a camera module, the imaging apparatus 10 includes an imaging lens assembly 11, a driving apparatus 12 and an image sensor 13, wherein the imaging lens assembly 11 includes the imaging lens assembly of the 1st embodiment and a lens barrel (not shown in drawings) for carrying the imaging lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The imaging lens assembly can obtain a favorable imaging position by the driving apparatus 12 so as to capture clear images when the imaged object is disposed at different object distances.

The imaging apparatus 10 can include the image sensor 13 disposed on the image surface of the imaging lens assembly, such as CMOS and CCD, which has superior photosensitivity and low noise, thus it is favorable for providing realistic images in high definition thereof.

Moreover, the imaging apparatus 10 can further include an image stabilization module 14, which can be a kinetic energy sensor, such as an accelerometer, a gyroscope, and a Hall effect sensor. In the 8th embodiment, the image stabilization module 14 is a gyroscope, but is not limited thereto. Therefore, the variation of different axial directions of the imaging lens assembly can adjusted so as to compensate the image blur generated by motion at the moment of exposure, and it is further favorable for enhancing the image quality while photographing in motion and low light situations. Furthermore, advanced image compensation functions, such as optical image stabilizations (OIS) and electronic image stabilizations (EIS) etc., can be provided.

9th Embodiment

Figure 17A:
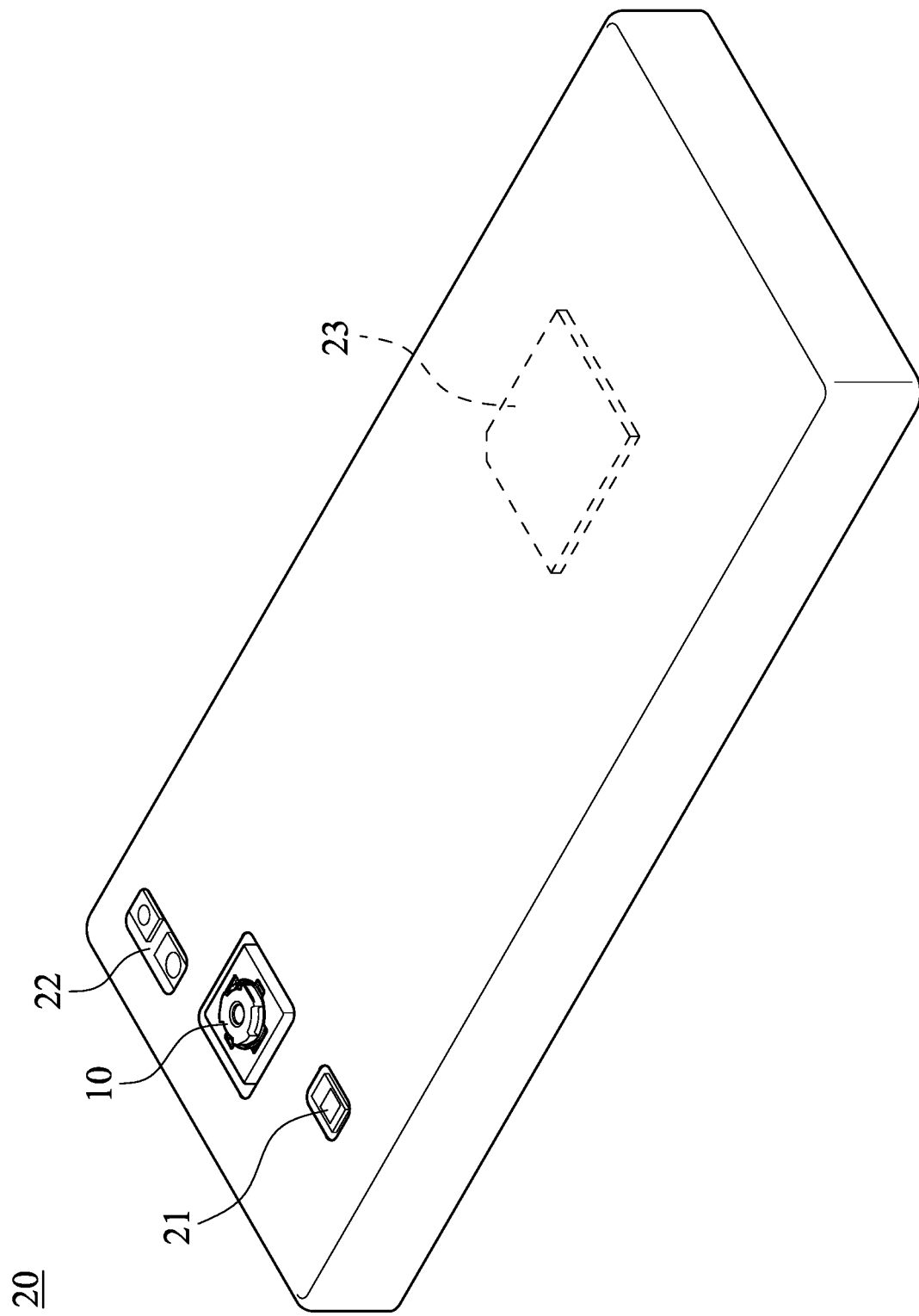
FIG. 17A is a schematic view of one side of an electronic device according to the 9th embodiment of the present disclosure.
Figure 17B:
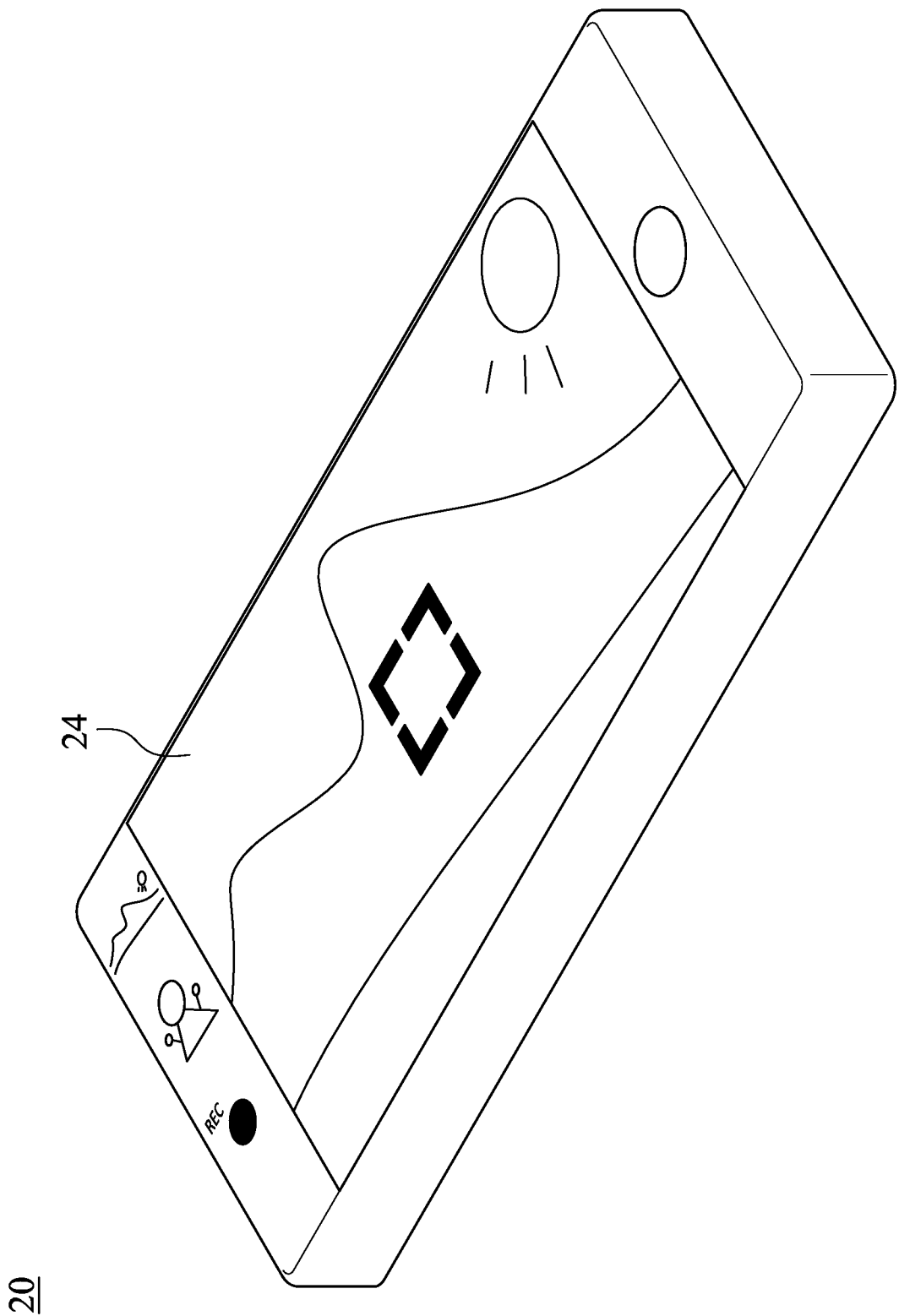
FIG. 17B is a schematic view of another side of the electronic device of FIG. 17A.
Figure 17C:
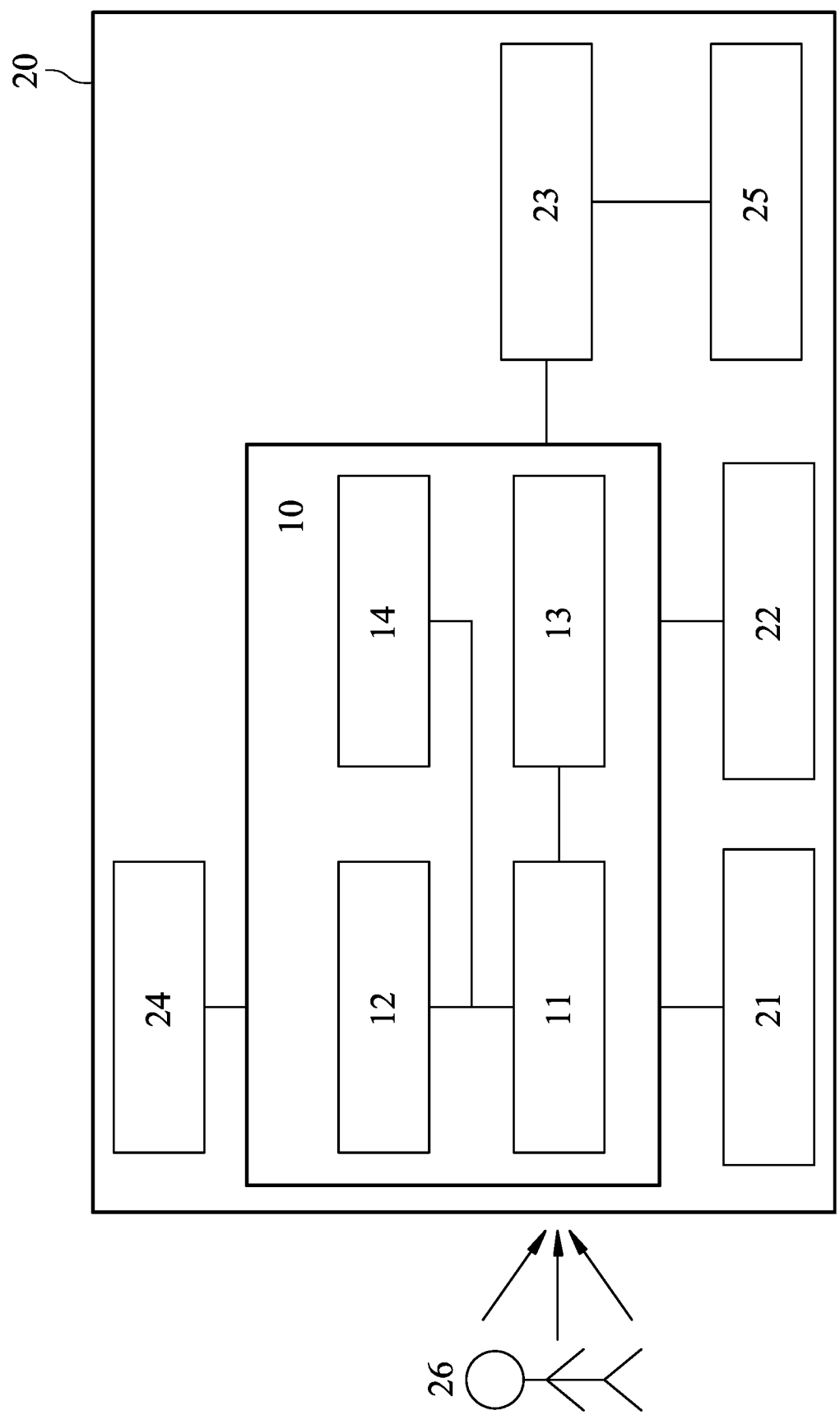
FIG. 17C is a system schematic view of the electronic device of FIG. 17A.

FIG. 17A is a schematic view of one side of an electronic device 20 according to the 9th embodiment of the present disclosure. FIG. 17B is a schematic view of another side of the electronic device 20 of FIG. 17A. FIG. 17C is a system schematic view of the electronic device 20 of FIG. 17A. In FIGS. 17A, 17B and 17C, the electronic device 20 according to the 9th embodiment is a smartphone; the electronic device 20 includes the imaging apparatus 10, a flash module 21, a focusing assisting module 22, an image signal processor 23, a user interface 24 and an image software processor 25. When the user captures images of an imaged object 26 via the user interface 24, the electronic device 20 focuses and generates an image via the imaging apparatus 10 while compensating for low illumination via the flash module 21. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The imaging apparatus 10 according to the 9th embodiment is the same as the imaging lens assembly 10 according to the 8th embodiment, and will not describe again herein.

10th Embodiment

Figure 18:
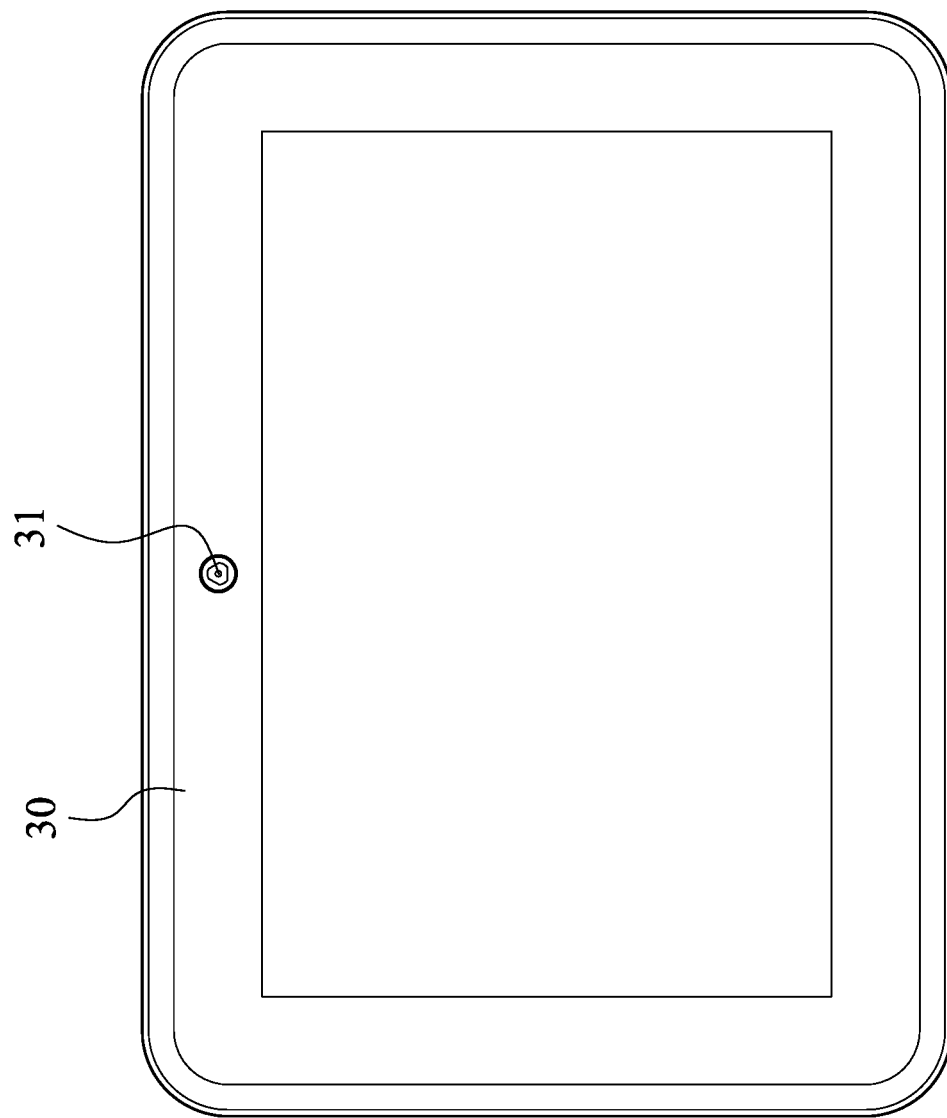
FIG. 18 is a schematic view of an electronic device according to the 10th embodiment of the present disclosure.

FIG. 18 is a schematic view of an electronic device 30 according to the 10th embodiment of the present disclosure. The electronic device 30 of the 10th embodiment is a tablet personal computer, wherein the electronic device 30 includes an imaging apparatus 31, wherein the imaging apparatus 31 is the same as stated in the 8th embodiment, and will not describe again herein.

11th Embodiment

Figure 19:
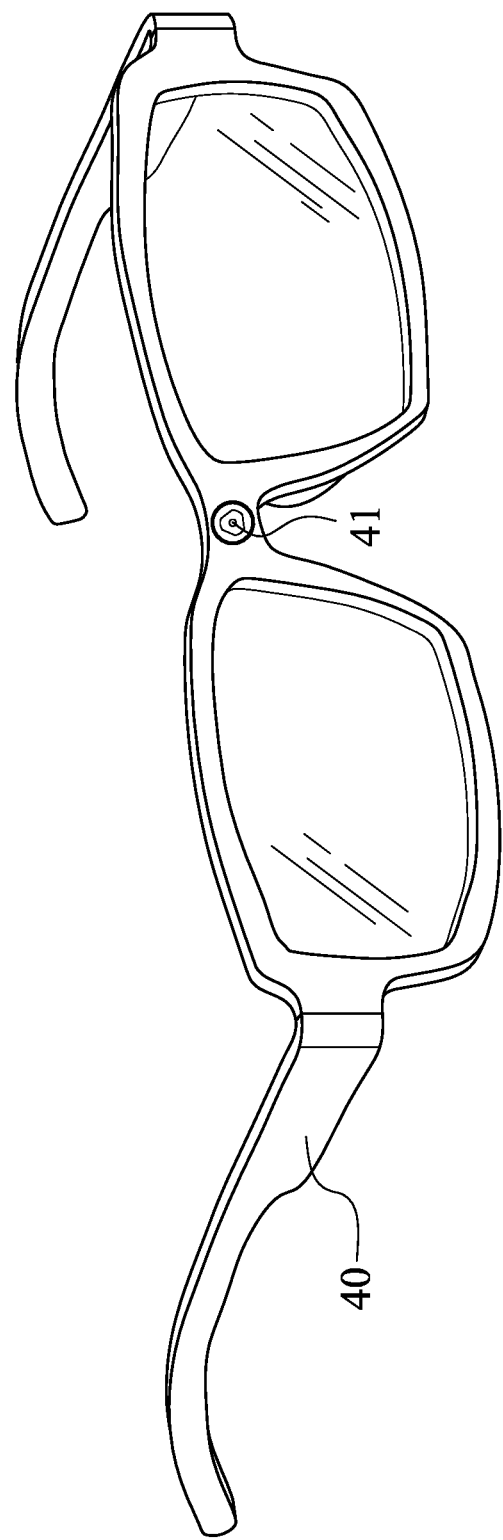
FIG. 19 is a schematic view of an electronic device according to the 11th embodiment of the present disclosure.

FIG. 19 is a schematic view of an electronic device 40 according to the 11th embodiment of the present disclosure. The electronic device 40 of the 11th embodiment is a wearable device, wherein the electronic device 40 includes an imaging apparatus 41, wherein the imaging apparatus 41 is the same as stated in the 18th embodiment, and will not describe again herein.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising five lens elements, the five lens elements being, in order from an object side to an image side:
 a first lens element having positive refractive power;
 a second lens element having positive refractive power;
 a third lens element;
 a fourth lens element with negative refractive power having an object-side surface being convex in a paraxial region thereof and an image-side surface being concave in a paraxial region thereof, wherein the object-side surface and the image-side surface of the fourth lens element are both aspheric; and
 a fifth lens element having an image-side surface being concave in a paraxial region thereof, wherein an object-side surface and the image-side surface of the fifth lens element are both aspheric, and the image-side surface of the fifth lens element comprises at least one convex critical point in an off-axis region thereof;
 wherein a focal length of the imaging lens assembly is f, a focal length of the first lens element is f1, a focal length of the third lens element is f3, a focal length of the fourth lens element is f4, a focal length of the fifth lens element is f5, and the following conditions are satisfied:

$$0.75<|f/f4|+|f/f5|; \text{ and}$$

$$|f1/f3|<1.0.$$

2. The imaging lens assembly of claim 1, wherein the fifth lens element with positive refractive power has the object-side surface being convex in a paraxial region thereof, the focal length of the imaging lens assembly is f, the focal length of the fourth lens element is f4, the focal length of the fifth lens element is f5, and the following condition is satisfied:

$$1.25<|f/f4|+|f/f5|<3.5.$$

3. The imaging lens assembly of claim 1, wherein an Abbe number of the third lens element is V3, an Abbe number of the fourth lens element is V4, and the following condition is satisfied:

$$10<V3+V4<60.$$

4. The imaging lens assembly of claim 1, wherein the object-side surface of the fourth lens element comprises at least one concave critical point in an off-axis region thereof, and the image-side surface of the fourth lens element comprises at least one convex critical point in an off-axis region thereof.

5. The imaging lens assembly of claim 1, wherein the second lens element has an image-side surface being convex in a paraxial region thereof, a curvature radius of an object-side surface of the second lens element is R3, a curvature radius of the image-side surface of the second lens element is R4, and the following condition is satisfied:

$0.75<(R3+R4)/(R3-R4)<4.0$.

6. The imaging lens assembly of claim 1, wherein the focal length of the first lens element is f1, a focal length of the second lens element is f2, the focal length of the third lens element is f3, the focal length of the fourth lens element is f4, the focal length of the fifth lens element is f5, and the following conditions are satisfied:

$|f4|<|f1|<|f3|$;

$|f5|<|f1|<|f3|$;

$|f4|<|f2|<|f3|$; and $|f5|<|f2|<|f3|$.

7. The imaging lens assembly of claim 1, wherein the focal length of the imaging lens assembly is f, a curvature radius of the object-side surface of the fourth lens element is R7, a curvature radius of the image-side surface of the fourth lens element is R8, and the following condition is satisfied:

$(|R7|+|R8|)/f<1.50$.

8. The imaging lens assembly of claim 1, wherein the third lens element has an image-side surface being convex in a paraxial region thereof, the focal length of the imaging lens assembly is f, the focal length of the third lens element is f3, and the following condition is satisfied:

$-1.0<f/f3<0.50$.

9. The imaging lens assembly of claim 1, further comprising:
an aperture stop, wherein a displacement in parallel with an optical axis from an axial vertex of an object-side surface of the first lens element and the aperture stop is Dr1s, and a displacement in parallel with the optical axis from the aperture stop and an axial vertex of an image-side surface of the first lens element is Dsr2, and the following condition is satisfied:

$|Dr1s/Dsr2|<0.33$.

10. The imaging lens assembly of claim 1, wherein the focal length of the imaging lens assembly is f, the focal length of the fourth lens element is f4, the focal length of the fifth lens element is f5, and the following condition is satisfied:

$(f/f4)-(f/f5)<-2.0$.

11. The imaging lens assembly of claim 1, wherein the first lens element has an image-side surface comprising at least one convex critical point in an off-axis region thereof.

12. The imaging lens assembly of claim 1, wherein a maximum field of view of the imaging lens assembly is FOV, an axial distance between an object-side surface of the first lens element and an image surface is TL, a maximum image height of the imaging lens assembly is ImgH, and the following conditions are satisfied:

85 degrees<FOV<120 degrees; and $TL/ImgH<1.60$.

13. The imaging lens assembly of claim 1, wherein the focal length of the imaging lens assembly is f, a maximum optical effective radius of the image-side surface of the fifth lens element is Y52, and the following condition is satisfied:

$0.90<f/Y52<1.30$.

14. The imaging lens assembly of claim 1, wherein an axial distance between an object-side surface of the first lens element and an image surface is TL, a maximum image height of the imaging lens assembly is ImgH, a half of a maximum field of view of the imaging lens assembly is HFOV, and the following condition is satisfied:

$1.80<TL/ImgH+1/\tan(HFOV)<2.60$.

15. An imaging apparatus, comprising:
the imaging lens assembly of claim 1; and
an image sensor, wherein the image sensor is disposed on an image surface of the imaging lens assembly.

16. An electronic device, comprising:
the imaging apparatus of claim 15.

17. An imaging lens assembly comprising five lens elements, the five lens elements being, in order from an object side to an image side:
a first lens element having positive refractive power;
a second lens element with positive refractive power having an image-side surface being convex in a paraxial region thereof;
a third lens element;
a fourth lens element with negative refractive power having an image-side surface being concave in a paraxial region thereof, wherein an object-side surface and the image-side surface of the fourth lens element are both aspheric; and
a fifth lens element having an image-side surface being concave in a paraxial region thereof, wherein an object-side surface and the image-side surface of the fifth lens element are both aspheric, and the image-side surface of the fifth lens element comprises at least one convex critical point in an off-axis region thereof;
wherein an Abbe number of the third lens element is V3, an Abbe number of the fourth lens element is V4, a focal length of the first lens element is f1, a focal length of the third lens element is f3, and the following conditions are satisfied:

$10<V3+V4<60$; and $|f1/f3|<1.0$.

18. The imaging lens assembly of claim 17, wherein the focal length of the first lens element is f1, a focal length of the second lens element is f2, and the following condition is satisfied:

$0.70<|f1/f2|<1.70$.

19. The imaging lens assembly of claim 17, wherein a curvature radius of an object-side surface of the third lens element is R5, a curvature radius of an image-side surface of the third lens element is R6, a focal length of the imaging lens assembly is f, and the following condition is satisfied:

$(|R5|+|R6|)/f<1.0$.

20. The imaging lens assembly of claim 17, further comprising:
an aperture stop, wherein a displacement in parallel with an optical axis from an axial vertex of an object-side surface of the first lens element and the aperture stop is Dr1s, and a displacement in parallel with the optical axis from the aperture stop and an axial vertex of an image-side surface of the first lens element is Dsr2, and the following condition is satisfied:

$|Dr1s/Dsr2|<0.33$.

21. The imaging lens assembly of claim 17, wherein a focal length of the fourth lens element is f4, a focal length of the fifth lens element is f5, and the following condition is satisfied:

$$-2.0 < f4/f5 < -0.75.$$

22. The imaging lens assembly of claim 17, wherein an Abbe number of the first lens element is V1, an Abbe number of the second lens element is V2, the Abbe number of the third lens element is V3, the Abbe number of the fourth lens element is V4, and the following condition is satisfied:

$$1.75 < (V1+V2)/(V3+V4) < 3.50.$$

23. The imaging lens assembly of claim 17, wherein the Abbe number of the third lens element is V3, the Abbe number of the fourth lens element is V4, and the following condition is satisfied:

$$25 < V3+V4 < 50.$$

24. The imaging lens assembly of claim 17, wherein a focal length of the imaging lens assembly is f, a focal length of the fourth lens element is f4, a focal length of the fifth lens element is f5, and the following condition is satisfied:

$$(f/f4)-(f/f5) < -2.0.$$

25. The imaging lens assembly of claim 17, wherein a maximum field of view of the imaging lens assembly is FOV, an axial distance between an object-side surface of the first lens element and an image surface is TL, a maximum image height of the imaging lens assembly is ImgH, and the following conditions are satisfied:

$$85 \text{ degrees} < FOV < 120; \text{ and}$$

$$TL/ImgH < 1.60.$$

* * * * *